United States Patent
Czerwiec et al.

(10) Patent No.: US 6,940,859 B2
(45) Date of Patent: Sep. 6, 2005

(54) LINE TERMINATION EQUIPMENT

(75) Inventors: Richard M. Czerwiec, Raleigh, NC (US); Joseph E. Sutherland, Raleigh, NC (US); Peter M. L. Schepers, Bornem (BE); Geert A. E. Van Wonterghem, Eeklo (BE); Eduard C. M. Boeykens, Bornem (BE); Chris Van Der Auwera, Mechelen (BE); Peter A. R. Van Rompu, Puurs (BE); Kurt Pynaert, Oost-Vlaanderen (BE); Peter P. F. Reusens, Laarne (BE)

(73) Assignee: Alcatel, Paris (FR)

( * ) Notice: Subject to any disclaimer, the term of this patent is extended or adjusted under 35 U.S.C. 154(b) by 889 days.

(21) Appl. No.: 09/952,351

(22) Filed: Sep. 13, 2001

(65) Prior Publication Data

US 2002/0031116 A1 Mar. 14, 2002

Related U.S. Application Data

(62) Division of application No. 08/891,145, filed on Jul. 10, 1997, now Pat. No. 6,314,102.

(51) Int. Cl.[7] .............................................. H04L 12/28
(52) U.S. Cl. .................. 370/395.1; 370/419; 379/93.07
(58) Field of Search ................................ 370/419–421, 370/395.1, 463, 493–495; 379/93.01, 93.05, 93.07

(56) References Cited

U.S. PATENT DOCUMENTS

| | | | |
|---|---|---|---|
| 5,181,106 A | 1/1993 | Sutherland |
| 5,189,673 A | 2/1993 | Burton et al. |
| 5,191,456 A | 3/1993 | Sutherland et al. |
| 5,283,678 A | 2/1994 | Czerwiec |
| 5,301,050 A | 4/1994 | Czerwiec et al. |
| 5,303,229 A | 4/1994 | Withers et al. |
| 5,446,726 A | 8/1995 | Rostoker et al. |
| 5,495,483 A | 2/1996 | Grube et al. |
| 5,512,936 A | 4/1996 | Burton et al. |
| 5,519,731 A | 5/1996 | Cioffi |
| 5,521,906 A | 5/1996 | Grube et al. |
| 5,533,008 A | 7/1996 | Grube et al. |
| 5,534,912 A | 7/1996 | Kostreski |
| 5,539,777 A | 7/1996 | Grube et al. |
| 5,557,612 A | 9/1996 | Bingham |
| 5,572,347 A | 11/1996 | Burton et al. |
| 5,576,874 A | 11/1996 | Czerwiec et al. |
| 5,581,479 A | 12/1996 | McLaughlin et al. |
| 5,594,491 A | 1/1997 | Hodge et al. |
| 5,594,576 A | 1/1997 | Sutherland et al. |
| 5,596,604 A | 1/1997 | Cioffi et al. |

(Continued)

FOREIGN PATENT DOCUMENTS

| | | |
|---|---|---|
| DE | 29607357 | 6/1996 |
| EP | 0831624 | 3/1998 |
| GB | 2291316 | 1/1996 |
| WO | 9521488 | 8/1995 |
| WO | 971153 | 3/1997 |
| WO | 9737458 | 10/1997 |
| WO | 9820702 | 5/1998 |
| WO | 9836541 | 8/1998 |
| WO | 9903221 | 1/1999 |

OTHER PUBLICATIONS

"Asymmetric Digital Subscriber Line: Interim Technology for the Next Forty Years", Kim Maxwell, IEEE Communications Magazine, Oct. 1996, pp. 100–106.

*Primary Examiner*—Frank Duong

(57) ABSTRACT

Line termination equipment may include a replaceable printed circuit board or card for use in a shelf of a telecommunications system with plural twisted pairs connected to corresponding plural subscribers via said card, each subscriber channel on each card including a hybrid circuit connected to one of the plural twisted pairs, a highpass filter, a modulator/encoder and a demodulator/decoder.

24 Claims, 34 Drawing Sheets

U.S. PATENT DOCUMENTS

| | | |
|---|---|---|
| 5,604,682 A | 2/1997 | McLaughlin et al. |
| 5,606,577 A | 2/1997 | Grube et al. |
| 5,608,725 A | 3/1997 | Grube et al. |
| 5,612,742 A | 3/1997 | Krause et al. |
| 5,613,190 A | 3/1997 | Hylton |
| 5,619,505 A | 4/1997 | Grube et al. |
| 5,623,513 A | 4/1997 | Chow et al. |
| 5,623,543 A | 4/1997 | Cook |
| 5,625,651 A | 4/1997 | Cioffi |
| 5,627,501 A | 5/1997 | Biran et al. |
| 5,627,863 A | 5/1997 | Aslanis et al. |
| 5,636,139 A | 6/1997 | McLaughlin et al. |
| 5,636,224 A | 6/1997 | Voith et al. |
| 5,668,857 A | 9/1997 | McHale |
| 5,687,014 A | 11/1997 | Czerwiec et al. |
| 5,756,280 A | 5/1998 | Soora et al. |
| 5,790,548 A | 8/1998 | Sistanizadeh et al. |
| 5,812,786 A | 9/1998 | Seazholtz et al. |
| 5,818,511 A | 10/1998 | Farry et al. |
| 5,852,655 A | 12/1998 | McHale et al. |
| 5,905,781 A * | 5/1999 | McHale et al. .......... 379/93.14 |
| 5,910,970 A | 6/1999 | Lu |
| 5,926,472 A | 7/1999 | Byers |
| 6,084,881 A * | 7/2000 | Fosmark et al. ............ 370/397 |

\* cited by examiner

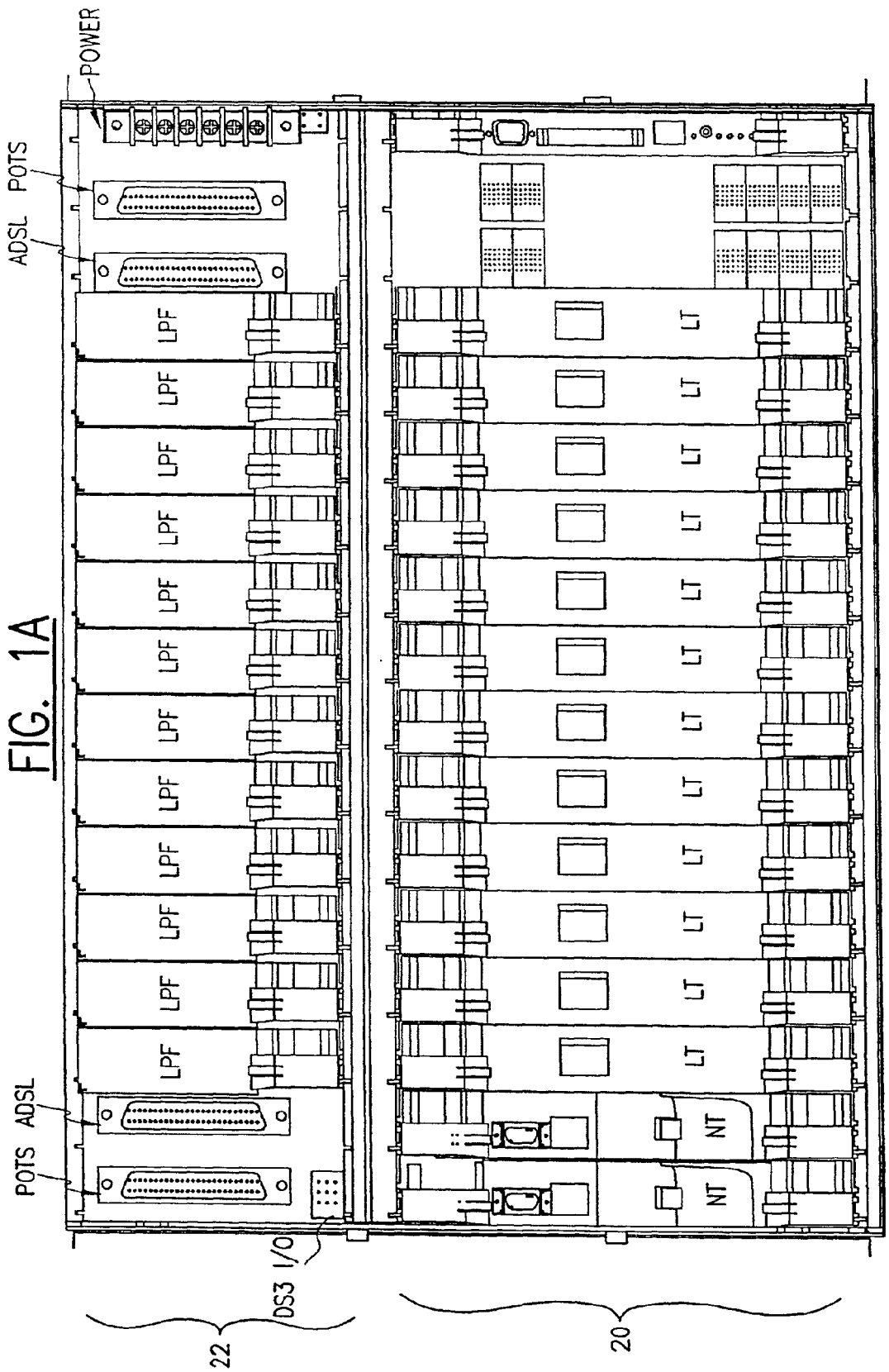

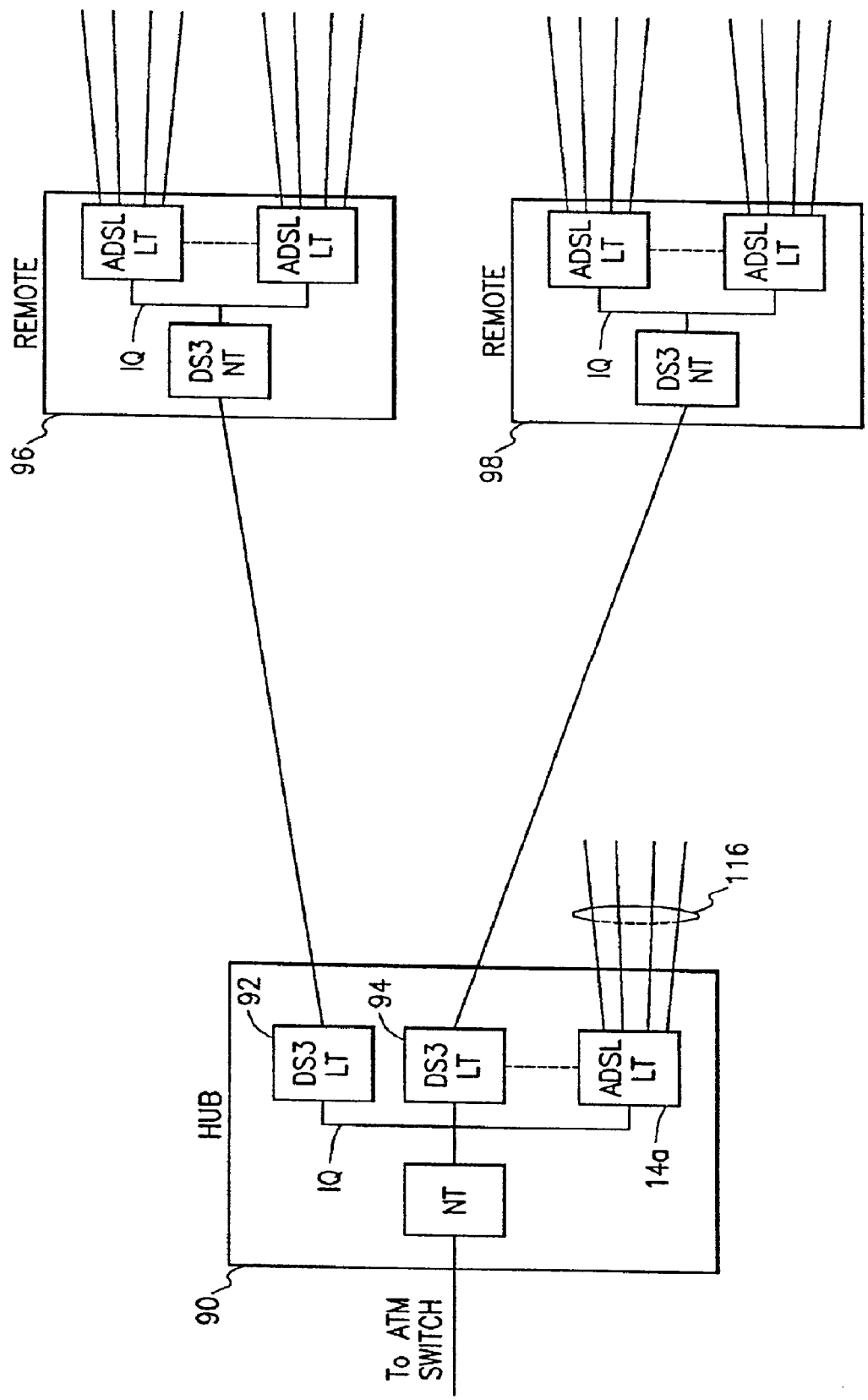

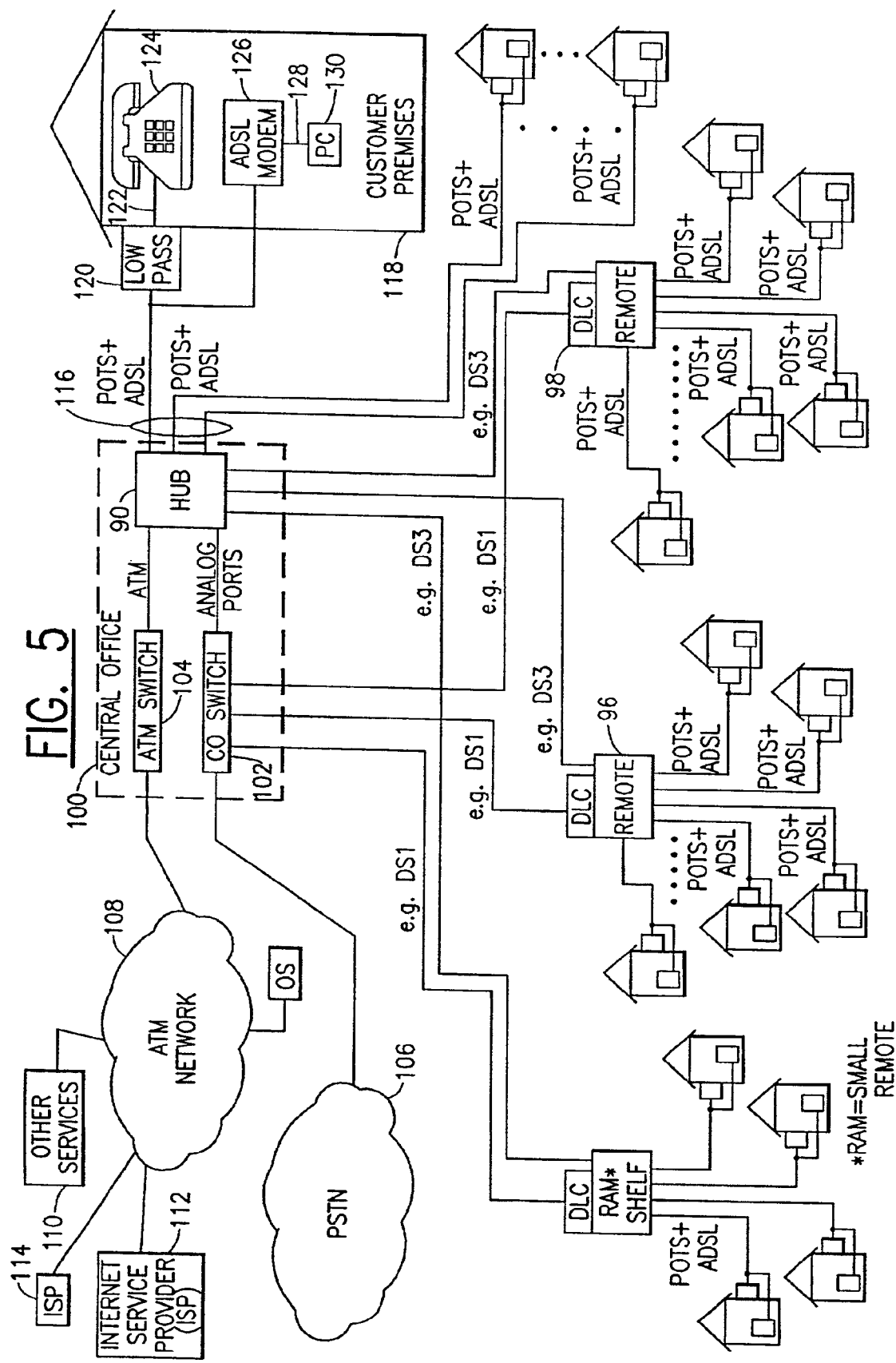

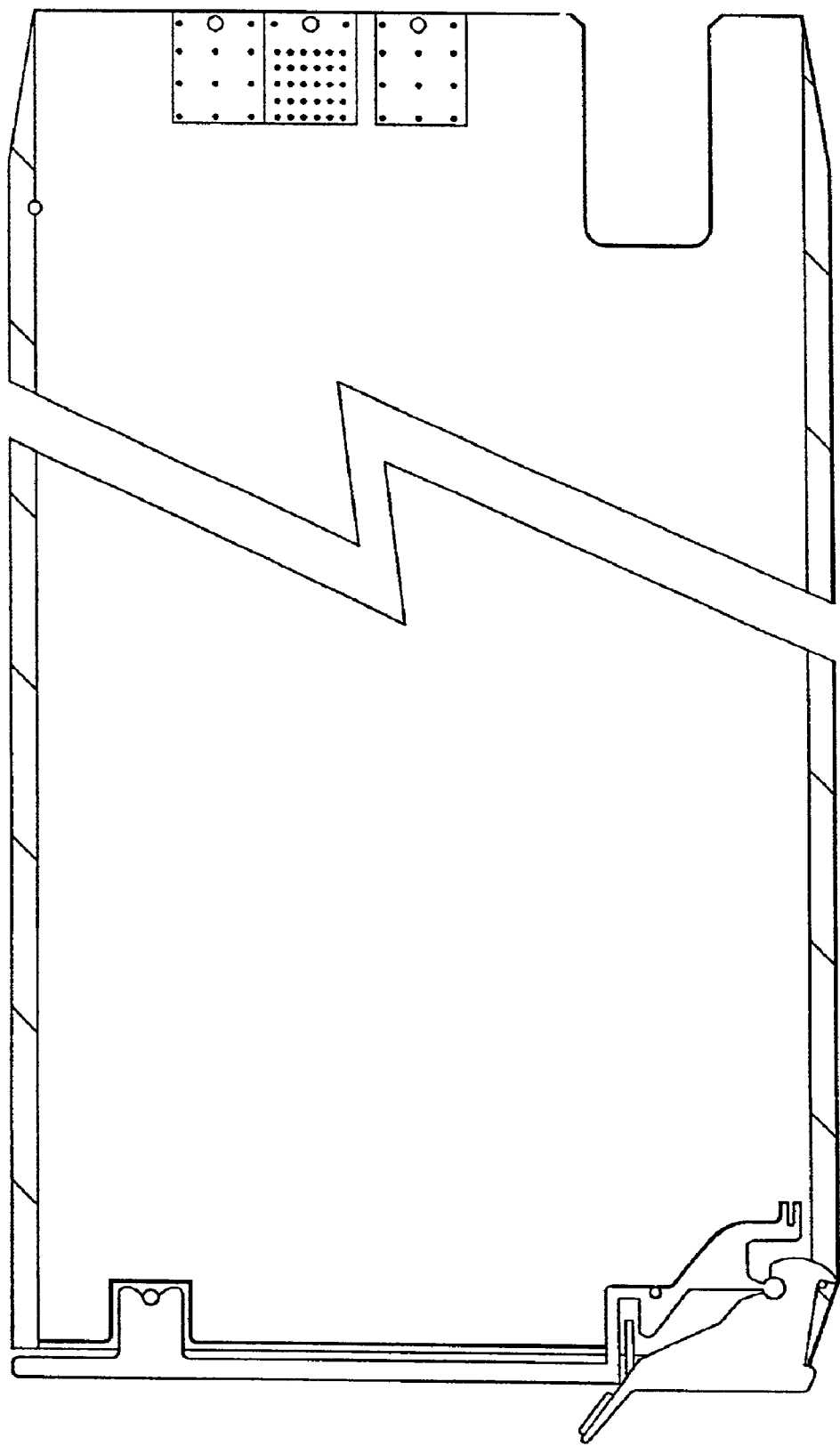

| INDICATOR | | MEANING |
|---|---|---|
| NAME | COLOR | |
| ATMF-25 | Green | ATMF data transport activity |
| TX/RX | Green | Data transmit/receive |
| Line Error | Red | Excessive line errors-bad ADSL line |
| 10 Base-T | Green | Ethernet data transport activity |
| Power/Sync. | Red | Power-on – initialization phase |
| | Green | Line synchronization-ready to operate |

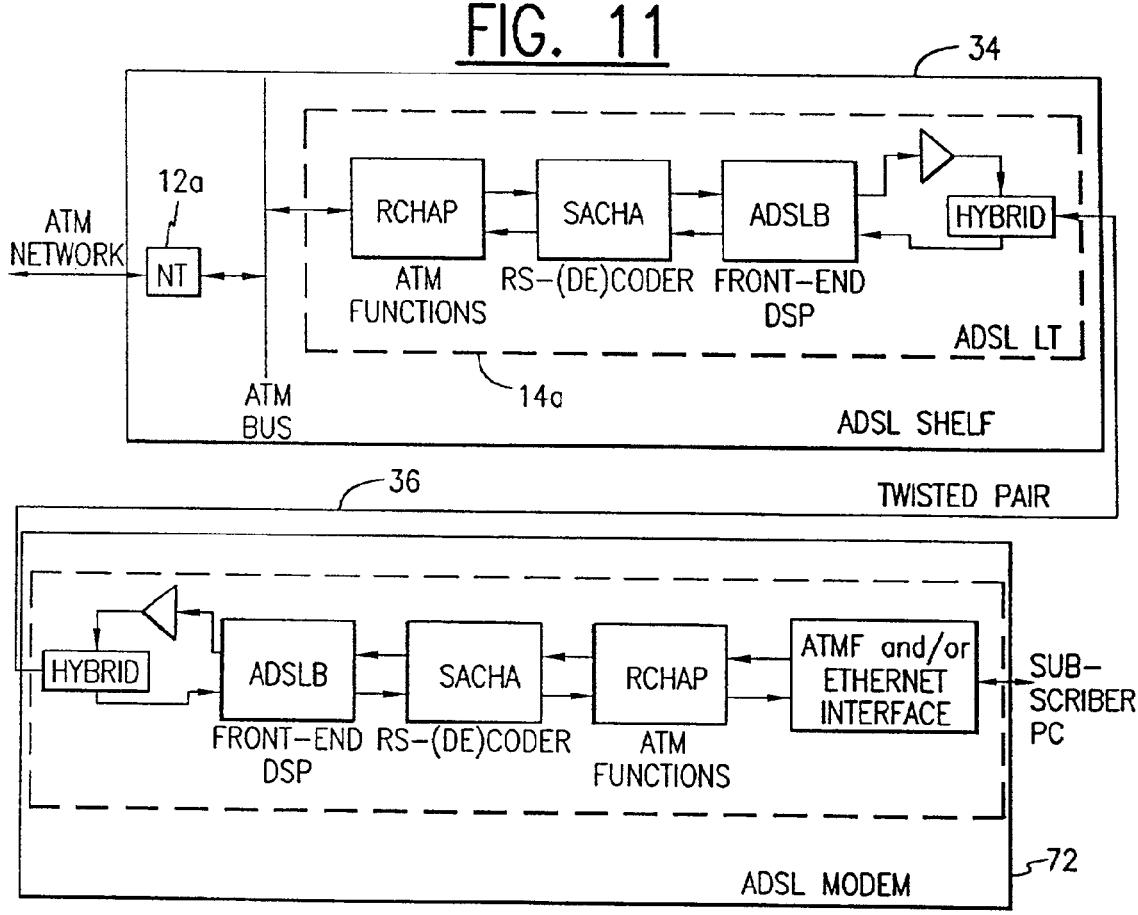
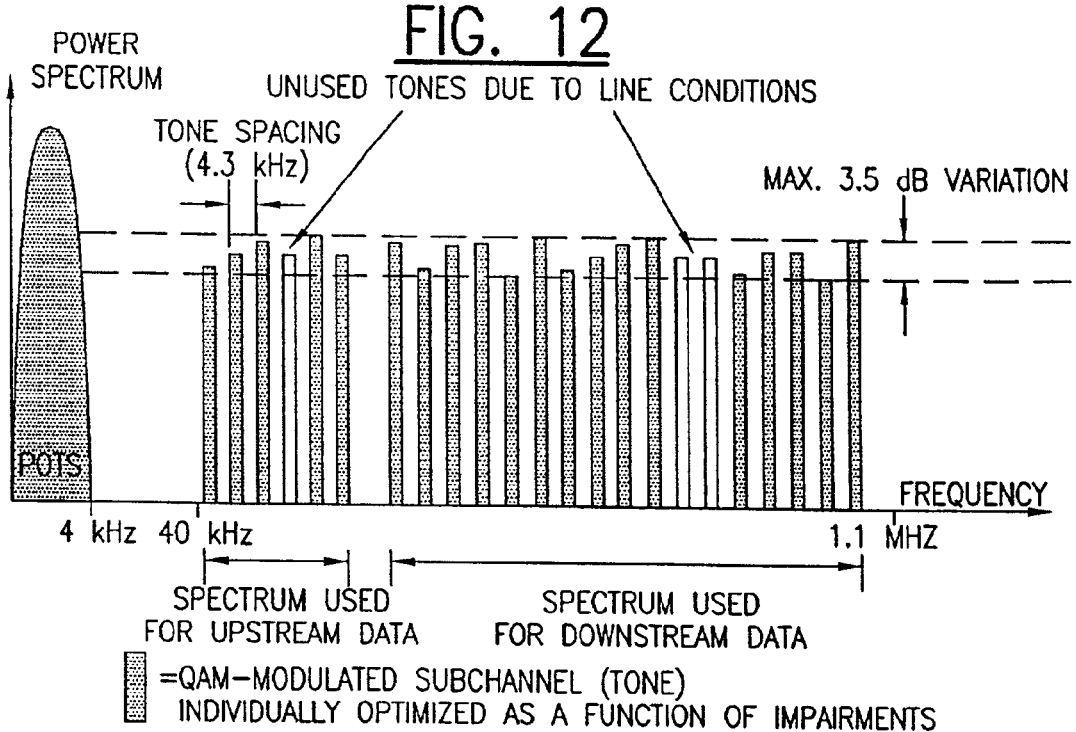

FIG. 14B

| DOWNSTREAM† FUNCTIONS | UPSTREAM† FUNCTIONS | |
|---|---|---|
| Optical interface | Reading ATM cells from the ATM interface (IQ BUS) | ⑤ |
| Locking on received clock | ATM cell extraction | |
| Serial to parallel conversion | ATM cell insertion | |
| STM1/STS3c frame alignment recovery | ATM layer processing plus cell rate decoupling | ⑥ |
| STM1/STS3c descrambling | ATM cell Header Error Control (HEC) calculation | |
| F1, F2, or F3 OAM functions | ATM cell payload scrambling | |
| ATM cell delineation (in virtual container type 4s) | Mapping of ATM cells in virtual container type 4s | |
| ATM cell HEC checking | F1, F2, or F3 OAM functions | ⑦ |
| ATM cell payload descrambling | STM1/STS3c scrambling | |
| ATM layer processing plus cell rate decoupling | STM1/STS3c frame generation | |
| ATM cell extraction | Parallel to serial conversion | |
| ATM cell insertion | Produce transmit clock out of recieved clock or local oscillator | ⑧ |
| Provision of access to the ATM IQ bus | Optical interface | |

Groupings on left: ① (rows 1-3), ② (rows 4-6), ③ (rows 7-10), ④ (row 11)

Note †Upstream is in the direction of the transport system and downstream is in the direction of the ATM IQ interface.

FIG. 14A

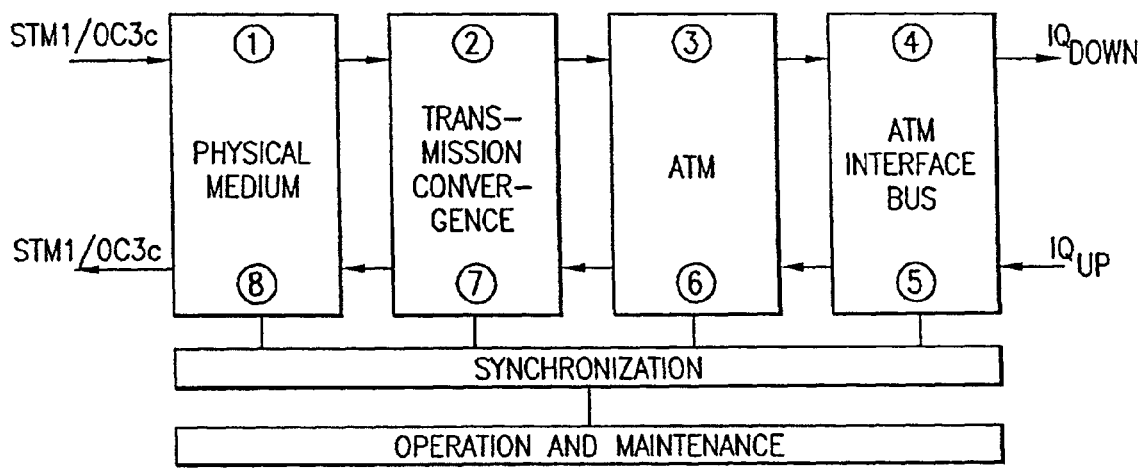

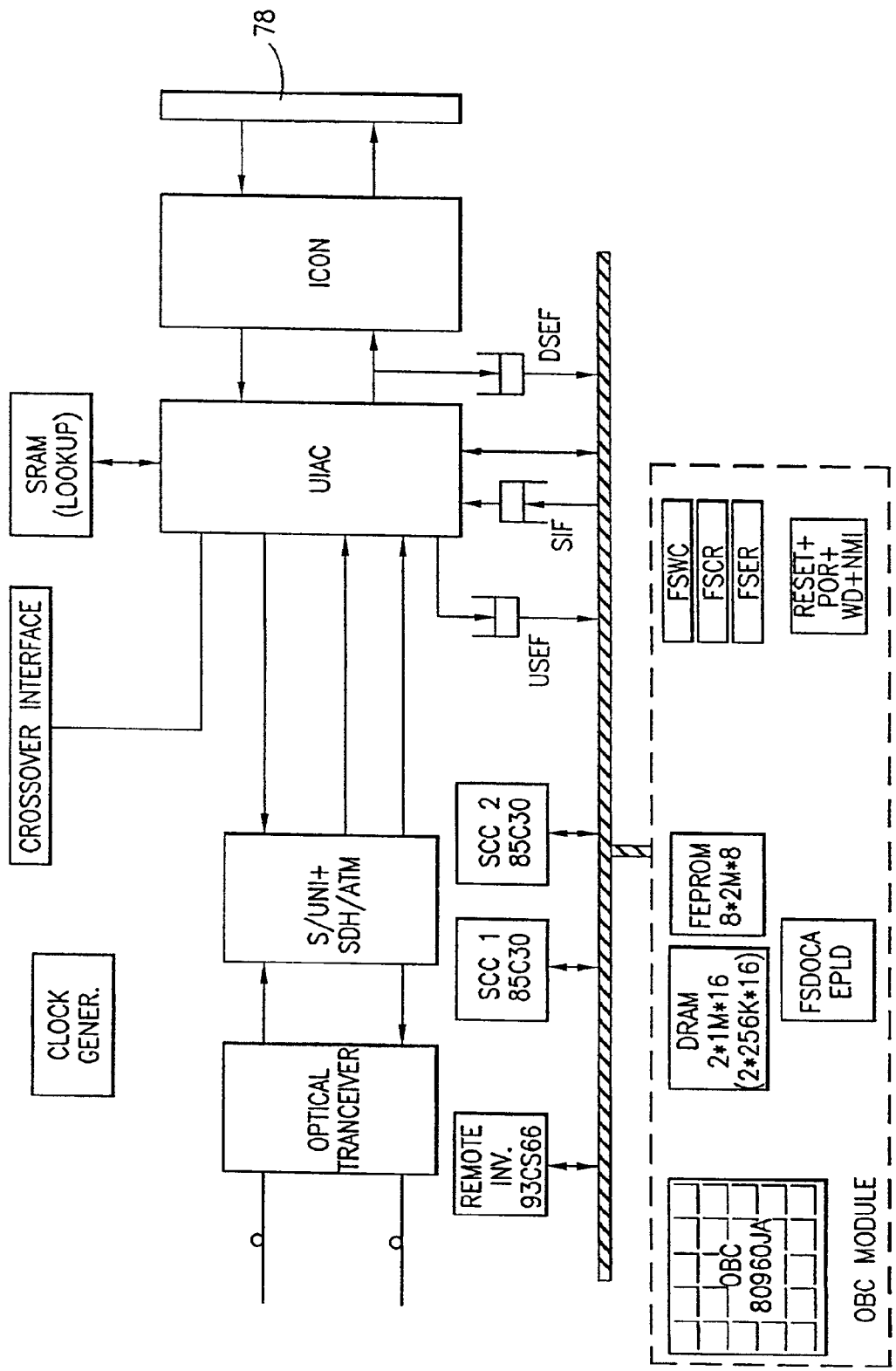

| Bit/Octet | 7 | 6 | 5 | 4 | 3 | 2 | 1 | 0 | |
|---|---|---|---|---|---|---|---|---|---|
| | GFC(*) | | | | VPI | | | | 1 |
| | VPI | | | | VCI | | | | 2 |
| | VCI | | | | | | | | 3 |
| | VCI | | | | PTI | | | CLP | 4 |
| | HEC | | | | | | | | 5 |

| VPI | | | VCI | | | | MODE |
|---|---|---|---|---|---|---|---|
| #3 | #2 | #1 | #4 | #3 | #2 | #1 | |
| X | X | X | | | X | | NNI |
| | X | X | | | X | X | UNI 1 |
| | | X | | X | X | X | UNI 2 |

FIG. 15B

| Item Number | Function Description |
|---|---|
| 1 | Provides a central office alarm interface |
| 2 | Provides a telemetry alarm interface |
| 3 | Collects up to 2 rack fan alarms, 1 Top Rack Unit (TRU) fuse alarm, 5 miscellaneous external alarms, 1 Alarm Cut-Off Audible Unit (ACO_AU) alarm, and 1 ACO Telemetry (ACO_TEL) alarm |
| 4 | Provides local craft terminal port |
| 5 | Provides an ethernet port (future option) |
| 6 | Provides a visual summary alarm display of rack minor, major, and critical alarm conditions |
| 7 | Provides a local Alarm Cut-Off (ACO) for Central Office (CO) alarms and a visual display of the ACO status |
| 8 | Provides a unit failure indicator |
| 9 | Provides a craft port for an asynchronous EIA-232-D function available to the user via a female 9-pin subminiature D connector on the front panel of the ACU |
| 10 | Handles input/output alarm information and generates alarm status/indicators via relay contacts or optical switches and Light Emitting Diodes (LEDs) for audible/visual/telemetry |
| 11 | Provides for a remote inventory function |
| 12 | Provides for Network Element Processor A (NEPA)/NEPB active/standby arbitration (future option) |
| 13 | Provides for NEPA/NEPB reset function (future option) |
| 14 | Provides for Joint Test Access Group (JTAG)/boundary scan testing |

Note    There is only one active craft port per ADSL system.

Note    The backplane has 5 Identifier (ID) bits dedicated for slot information that are read to check for proper slot insertion (ie., each slot has a unique address).

LINE TERMINATION EQUIPMENT

CROSS-REFERENCE TO RELATED APPLICATION

This application is a divisional of application Ser. No. 08/891,145, filed on Jul. 10, 1997 now U.S. Pat No. 6,314,102, and claims priority therefrom under 35 USC 120.

BACKGROUND OF THE INVENTION

1. Technical Field of the Invention

The present invention relates to providing high-speed communications services to ordinary residences and small businesses on digital subscriber lines.

2. Background of the Invention

The sudden emergence of the Internet has produced an urgent demand for high-speed communications services to ordinary residences and small businesses. These services are distinguished by bursty data patterns and asymmetrical data transfer far more information sent toward the subscriber premises than received from it. A partial response to this need, at least on the physical signal level, has been found in new "xDSL" transmission technologies, such as ADSL (Asymmetric Digital Subscriber Line). These have recently become sophisticated enough to allow dynamic bit-rate adaptation on each subscriber line, so that a wide range of loop lengths can be accommodated. But all this variability (bursty data, dynamic bit rates, etc.) has made it nearly impossible to predict, control, manage, or guarantee the Quality of Service (QoS) provided to each subscriber, as required for a viable commercial service.

Several companies are working on ADSL products using DMT (Discrete Multi-Tone) and/or CAP (Carrier-less Amplitude Phase Modulation) technology—each with their own equipment configurations and target applications. These products simply multiplex the ADSL data streams together with little or no flexible bandwidth control and no QoS management features.

SUMMARY OF THE INVENTION

An object of the present invention is to solve the management problems described above by combining the data management features of ATM (Asynchronous Transfer Mode) with the physical-layer transmission flexibility of xDSL.

Another object of the present invention is to provide an architecture for a telecommunications system in which plain old telephone service and a broadband digital service are simultaneously provided to individual subscribers on conventional transmission lines already deployed for telephony.

Still another object of the present invention is to provide such an architecture in such a way as to provide maintainability of the digital subscriber line hardware without interfering with lifeline telephony service to subscribers.

Yet another object of the present invention is to provide the practical hardware components capable of carrying out the above objects for such a system.

According to a first aspect of the present invention, a telecommunications system for providing both narrowband and broadband services to a plurality of subscriber premises comprises at least one shelf for connection to a public switched telephone network (PSTN) and for connection to an asynchronous transfer mode (ATM) network for connecting the PSTN and the ATM network to the plurality of subscriber premises via a corresponding plurality of twisted copper pairs, and a plurality of subscriber modems for connection to the corresponding plurality of twisted copper pairs, wherein each of the twisted copper pairs is for providing a digital subscriber line that accommodates both plain old telephone service (POTS) and digital channels in an ATM format. The digital subscriber line may be an asymmetric digital subscriber line (ADSL). Moreover, it may use a discrete multitone (DMT) technique, as known from American National Standards Institute (ANSI) Specification ANSI T1.413-1995. Or, it may use carrierless amplitude phase modulation (CAP).

ATM and xDSL have not previously been combined in this way to create a complete, viable, general-purpose access communications system for local loops. In fact, ADSL itself has only recently become feasible, since it was not clear how to use the bandwidth above the telephony spectrum (up to 3.4 kHz) over long distances on existing copper pairs. New LSI (large-scale integration) and DSP (digital signal processing) technologies have now made ADSL practical at multi-megabit per second rates, and the demand for high-speed data services (particularly Internet access) has made it necessary. Local telcos are also under tremendous pressure to relieve existing telephone switching systems from the overwhelming Internet/modem traffic they were never designed to handle. By using the system described in this disclosure, operating companies can simultaneously remove congestion from telephony switches, offer high-speed services to customers as a new revenue producer, and expand the types of services (i.e., QoS classes) offered to fit customers' individual needs.

The full bandwidth flexibility of ATM provides the framework to support a wide range of services required by different applications and achieves high-resource utilization. It is particularly advantageous in the present invention that ATM provides the possibility to reserve resources in the network to meet the quality of service requirements of the applications desired by the subscribers. This is particularly so in the present invention, because of the nature of, e.g., asymmetric digital subscriber lines wherein a very large bandwidth is dedicated downstream with a relatively small bandwidth reserved for upstream communications from subscribers. In that case, with an architecture having a large number of subscribers connected to an upstream network element, there can be, depending on the number of subscribers potentially connected to the network element, a severe bandwidth contention problem in the upstream direction. This can be balanced to some extent, according to the present invention, by offering differing qualities of service to the subscribers, which can be implemented by telcos using different rate structures.

According to a second aspect of the invention, a telecommunications system comprises subscriber equipment and provider equipment, with the subscriber equipment including a lowpass filter for use at a subscriber's premises responsive to a telephony signal occupying a baseband position in a frequency-division multiplexed signal, also having a wideband signal occupying a position above baseband, for only providing the telephony signal for use in voice communications between the subscriber's premises and a public switched telephone network, and a digital subscriber line modem for use at the subscriber's premises, responsive to the frequency-division multiplexed signal for providing the wideband service for use in digital communications between the subscriber's premises and a packet network, and wherein the provider equipment includes a shelf, responsive to the telephony signal and to the wideband signal, for providing the frequency-division multiplexed signal.

The second aspect of the present invention allows telephone subscribers to obtain efficient, high speed digital services to their homes and businesses over existing telephony copper pairs—while conventional analog "lifeline" telephony services are simultaneously provided with high integrity on the same pairs.

The key to these and other aspects of the present invention is a unique system architecture and a novel combination of xDSL and packet technology that work together to economically deliver services such as Internet access at speeds more than 100 times faster than conventional analog modems.

By providing the lowpass filter separately from the digital subscriber line modem, the modem can be maintained separately and without interfering with the lifeline telephony services, thereby providing the above-mentioned high integrity. A similar separation of the telephony services from the wideband services can be accomplished in the shelf as well, by providing a separate lowpass filter that is not part of the line termination of the wideband service in the shelf.

The preferred embodiment described below overlays adaptive-rate ADSL-coded, ATM-formatted data on existing copper pairs, but it should be realized that the system architecture described below can incorporate any kind of packet network and/or any of a variety of Digital Subscriber Line (DSL) transmission technologies, including ADSL, VDSL, HDSL, SDSL, and ISDN-BRA. The initial implementation of this invention uses the DMT coding method for ADSL specified in ANSI standard T1.413-1995, entitled "Network and Customer Installation Interfaces—Asymmetric Digital Subscriber Line (ADSL) Metallic Interface", but it should be realized that other coding methods can also be used.

In addition, multiple ATM service classes and their respective Quality of Service (QoS) parameters are supported, allowing customers to subscribe to CBR (Constant Bit Rate), VBRrt (Variable Bit Rate-real time), VBRnrt (Variable Bit Rate-not real time) and UBR (Unspecified Bit Rate) services, as well as a new service called UBR+ which allows a minimum bandwidth to be reserved for UBR traffic.

The architecture disclosed herein applies an ATM mux function and a unique "IQ" bus invention disclosed in detail in a related U.S. provisional patent application entitled "Method For Prioritized Data Transmission and Data Transmission Arrangement", having U.S. Ser. No. 60/052,125, filed on Jul. 10, 1997, now U.S. patent application Ser. No. 09/084,750, filed May 26, 1998, to allocate traffic within required parameters, based on a priority scheme using weighted service offerings and a cell aging mechanism. The "IQ" bus concept itself is an improvement over an "I*" bus access mechanism, as disclosed in U.S. patent application Ser. No. 09/022,177, filed Feb. 11, 1998, and which was based on U.S. provisional patent application 60/052,158, filed Jul. 10, 1997, now U.S. Pat. No. 6,105,084, issued Aug. 15, 2000, entitled "Priority-Based Access Control Method and Arrangement", and which is based on European Patent Application 97400303, filed on Feb.11, 1997, now EP patent publication EP 0858035, and which can also be used in selected embodiments of the present invention.

According to a third aspect of the present invention, a telecommunications system comprises at least one shelf for connection to a plurality of subscriber terminals for location at a corresponding plurality of subscriber premises by way of twisted copper pairs, wherein the at least one shelf is for housing a plurality of cards, including a network termination card for connection to a broadband network, a plurality of line termination cards for connection to the network termination card by means of a backplane bus of the shelf, and a plurality of lowpass filter cards, each for connection to a public switched telephone network, wherein each lowpass filter card is for connection to a corresponding line termination card for joining a plurality of telephony signals and a corresponding plurality of digital subscriber line signals at an upstream end of a twisted copper pair, and wherein each subscriber terminal comprises a lowpass filter for connection at a downstream end of a corresponding twisted copper pair for providing the telephony signal to a telephone, and a digital subscriber line modem also for connection at the downstream end of the twisted copper pair for connection to a data terminal.

According to a fourth aspect of the present invention, a telecommunications system comprises at least one shelf for housing a network termination card for connection to a broadband network, a plurality of line termination cards for connection to said network termination card by means of a backplane bus of said shelf, and a plurality of upstream end lowpass filter cards each for connection to a public switched telephone network, wherein each lowpass filter card is for connection to a corresponding line termination card for joining a plurality of telephony signals and a corresponding plurality of digital subscriber line signals at an upstream end of a corresponding plurality of twisted copper pairs, and a plurality of subscriber terminals for location at a corresponding plurality of subscriber premises, each subscriber terminal for connection at a downstream end of a corresponding twisted copper pair for communication with a corresponding upstream end lowpass filter and line termination card over said corresponding twisted copper pair, wherein each subscriber terminal comprises a downstream end lowpass filter for connection at said downstream end of said corresponding twisted copper pair and for connection to a telephone at a corresponding subscriber premises, and a digital subscriber line modem also for connection at said downstream end of said corresponding twisted copper pair for connection to a data terminal at said corresponding subscriber premises.

According to a fifth aspect of the present invention, a telecommunications system comprises subscriber equipment, comprising a downstream end lowpass filter for use at a subscriber's premises, responsive to a telephony signal occupying a baseband position in a frequency division multiplexed signal also having a wideband signal occupying a position above baseband, for only providing said telephony signal for use in voice communications between said subscriber's premises and a public switched telephone network, and a digital subscriber line modem for use at the subscriber's premises, responsive to said frequency division multiplexed signal for providing said wideband signal for use in digital communications between said subscriber's premises and a packet network, and provider equipment comprising a shelf, responsive to said telephony signal and to said wideband signal, for providing said frequency division multiplexed signal.

According to a sixth aspect of the present invention, subscriber equipment for use in a telecommunications system having a shelf for connection both to a telephone network and to a wideband network and having a plurality of subscriber lines for connection to subscriber equipment at a plurality of subscriber premises, wherein each subscriber equipment comprises a lowpass filter for use at a subscriber's premises, responsive to a telephony signal occupying a baseband position in a frequency division multiplexed signal also having a wideband signal occupying a position above baseband, for only providing said telephony signal between said lowpass filter and a subscriber's telephone for use in voice communications between said subscriber's premises and said telephone network, and a digital subscriber line modem for use at the subscriber's premises, for connection to said frequency division multiplexed signal for only providing said wideband signal between said digital subscriber line modem and a subscriber's data terminal for use in digital communications between said subscriber's premises and said wideband network.

According to a seventh aspect of the present invention, a shelf for use among a plurality of shelves in a rack for use in a telecommunications system for providing both narrowband and broadband services to a plurality of subscriber premises, comprising a housing for connection to a narrowband network and for connection to a broadband network for connecting said narrowband network and said broadband network to said plurality of subscriber premises via a corresponding plurality of twisted copper pairs, wherein said housing includes plural sections including an upper section for housing in a central portion thereof a plurality of lowpass filter cards with connectors thereon for insertion in a backplane of said housing, and wherein said upper portion of said housing also has end portions reserved for connecting said narrowband network and said plurality of twisted copper pairs, and a lower section for housing a plurality of line termination cards in a central portion thereof, each with connectors thereon for insertion in said backplane of said housing, and wherein said lower section includes at least one end portion reserved for at least one network termination card for cable connection to said broadband network.

According to an eighth aspect of the present invention, line termination equipment for use in a shelf of a telecommunications system, said line termination equipment for connection to a plurality of subscriber lines for connection to a corresponding plurality of subscriber equipment at a plurality of subscriber premises, wherein said line termination equipment comprises plural subscriber channels, each comprising a hybrid circuit for connection to a corresponding twisted pair from a corresponding subscriber premises, each channel comprising a highpass filter for isolating a telephony signal occupying a baseband position in a frequency-division multiplexed signal from a wideband signal occupying a position above baseband, a modulator/encoder, responsive to said wideband signal for providing an encoded and modulated wideband signal to said hybrid circuit for providing said encoded and modulated wideband signal on said twisted copper pair in said position above baseband, and a demodulator/decoder, responsive to a wideband signal from said subscriber premises for providing a demodulated and decoded wideband signal to said wideband network.

According to a ninth aspect of the present invention, a replaceable printed board assembly for use in a shelf of a telecommunications system, wherein said shelf is for connection both to a telephone network and to a wideband network and having a plurality of subscriber lines for connection to subscriber equipment at a plurality of subscriber premises, wherein said replaceable PBA comprises a corresponding plurality of lowpass filters, each having a first port for connection to a plain old telephone service interface comprising a plurality of twisted copper pairs, and a second port for connection to a corresponding second plurality of twisted copper pairs for connection to said corresponding plurality of customer premises and to said wideband network via a wideband multiplex bus of said shelf.

According to a tenth aspect of the present invention, a telecommunications rack for connection to an upstream network service provider for providing said service to downstream subscriber equipment also for connection to said rack comprises a plurality of shelves, at least one shelf for connection to said upstream network service provider by means of network termination equipment, each shelf for connection to different equipment of said downstream subscriber equipment by means of line termination equipment, wherein each of said plurality of shelves has a same nonredundant feature, at least one pair of redundant line termination equipment, one line termination equipment of said pair for use in said at least one shelf in association with said same nonredundant feature thereof and a remaining line termination equipment of said pair for use in another shelf of said plurality of shelves in association with said same nonredundant feature thereof, and means for connecting said at least one shelf and said another shelf for providing said same nonredundant feature redundantly.

According to an eleventh aspect of the present invention, a network termination equipment for use in a shelf of a telecommunications system, said network termination equipment for connection to an asynchronous transfer mode network and to a plurality of line termination equipment also for use in said shelf for connection to subscriber equipment, wherein said network termination equipment comprises physical medium termination equipment for interfacing to a physical medium by means of a serial input/output connection to said ATM network for providing a parallel input/output transmission conveyance means connected to said parallel input/output for recovering/mapping ATM cells from/to frames of a transport format of said serial input/output, ATM layer processing means connected to said transmission conveyance means for layer processing downstream ATM cells recovered by said transmission conveyance means and for providing upstream ATM cells to said transmission conveyance means, and an ATM bus interface responsive to downstream ATM cells from said ATM layer processing means for providing said downstream ATM cells with a guard byte for an ATM bus in said shelf and responsive to upstream ATM cells with a guard byte for providing said upstream cells to said ATM layer processing means without said guard byte.

Configurations of the architecture are taught for equipment located in local Central Offices, Remote sites and at customer' premises, as appropriate for a variety of cable plant topologies. The system building blocks (boards, connectors, shields, etc.) are physically organized in a new shelf arrangement detailed below that packs all these features into a high-density shelf that can be installed easily in conventional central offices, and remote cabinets and vaults.

Thus, the present invention provides a high-speed digital access communications system, covering a wide range of configurations and applications, using new packet and xDSL technologies with the possibility to offer subscribers the variety of QoS classes defined, for example, in the various ATM Forum specifications. Since it uses the existing copper cable plant already deployed throughout the developed world, the system is economical—allowing Local Exchange Carriers to compete with alternative service providers such as CATV companies (which are deploying heavily overbooked cable modem technology on their coax cable plant). The system also preserves the reliability and simplicity of analog "lifeline" POTS, so that subscribers and telephone operating companies are not required to change the way voice services are provided.

These and other objects, features and advantages of the present invention will become more apparent in light of the following detailed description of a best mode embodiment thereof, as illustrated in the accompanying drawing.

BRIEF DESCRIPTION OF THE DRAWING

FIG. 1A shows the shelf of FIG. 1 in detail, and in particular shows how front access is achieved.

FIG. 4 shows additional flexibility built into an xDSL shelf which is shown here in two different embodiments, one called a "hub" and the other a "remote", for use in an ASAM system, according to the present invention.

FIG. 5 shows how the hub and remotes of FIG. 4 could be deployed in one embodiment of an ASAM system, according to the present invention.

FIG. 7B shows a side view of such a lowpass filter card with four lowpass filter/splitter circuits thereon, for insertion in a slot of the upper portion 22 of the shelf 10 of FIG. 1.

FIG. 11 shows a simplified block diagram illustration of a channel of an LT card in a shelf connected to a subscriber ADSL modem via a twisted pair, according to the present invention.

FIG. 12 shows an example of frequency allocation of the telephony and the QAM-modulated subchannels (tones) individually optimized as a function of line impairments, according to the present invention.

FIG. 14A is a simplified block diagram illustration of an NT card, according to the present invention.

FIG. 14B is a table illustrating some of the downstream and upstream functions of the NT card of FIG. 14A.

FIG. 14E shows a more detailed block diagram of an NT card, according to the present invention.

FIG. 15B lists the functions of the signals of the ACU of FIG. 15A.

DETAILED DESCRIPTION OF PREFERRED EMBODIMENTS

Figure 1:
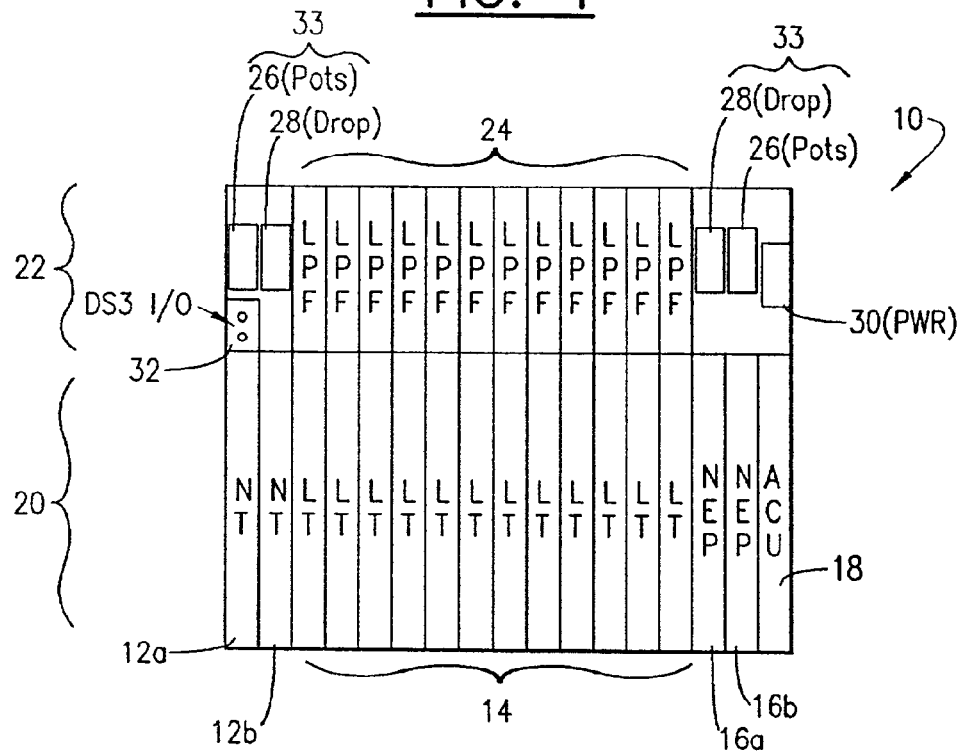
FIG. 1 illustrates a basic xDSL shelf layout, which may be an ADSL shelf in the embodiment illustrated, for use, for example, in an ATM subscriber access multiplexer (ASAM) system, according to the present invention.

FIG. 1 shows a new shelf arrangement 10 for use in a subscriber access multiplexer system according to the invention. The embodiment shown is for use in an ATM subscriber access multiplexer (ASAM) system, but it should be understood that the invention is not limited to ATM embodiments. The shelf 10 is populated by at least one or a redundant pair of network termination (NT) cards 12a, 12b, up to twelve xDSL, in this case ADSL (Asynchronous Digital Subscriber Line), line termination (LT) cards 14, an equal number of Low Pass Filter (LPF) cards 24, an optional Network Element Processor (NEP) 16a (or an optional redundant pair 16a, 16b), and an Alarm Collection Unit (ACU) 18. An LT card is described in more detail below in connection with FIG. 10, while a network termination card is described in more detail below in connection with FIGS. 14A–14E. A lowpass filter card is disclosed in more detail below in connection with FIGS. 7A, 7B and 7C. An alarm collection unit (ACU) 18 is shown in block diagram form in FIG. 15, and a physical embodiment is shown in FIG. 16.

These cards can be mounted as shown in FIG. 1 in a bottom section 20 of the shelf 10 and can be, e.g., six rack spaces in height where one rack space equals 1.75 inches (4.45 cm). An upper portion 22 of the shelf can be, e.g., three rack spaces in height for containing up to, e.g., twelve lowpass filter (LPF) cards 24, with each LPF card dedicated to an associated ADSL-LT directly below it. Also in the upper portion 22 of the shelf 10 may be located connections 26 for POTS (plain old telephone service) interfaces and connections 28 for drop tip/ring leads, connections 30 for power, and a small board 32 for DS-3-NT equipment protection as explained below. The POTS can, but need not, be in analog baseband form. It could take other forms, such as ISDN. Note that the lowpass filters 24 are grouped in the center of the upper portion 22 of the shelf, with the connections 26 for POTS and connections 28 for drop tip/ring leads for location at ends 33 of the upper portion 22 of the shelf. Since the lowpass filters plug into the backplane upon insertion in slots of the shelf and do not connect to cables, they are positioned in the center of the upper portion 22. The connections 26, 28, 30 and 32, on the other hand, require cabling access and are positioned, according to the present invention, at the ends 33 to facilitate such connections near the periphery of the shelf 10, rather than requiring cables passing over central portions of the shelf. Similarly, the LT cards 14 are positioned in the center of the lower section 20 of the shelf 10, since they do not require cabling and are connected to other modules by the backplane, to which they are connected via a connector upon insertion. Thus, the NTs 12A, 12B, the NEPs 16A, 16B and the ACU 18 are positioned at ends 35 of the lower section 20 to provide easy cable access. It is also noted that the shelf is designed entirely for front access. The shelf 10 can be dimensioned to fit both U.S. and European equipment racks, e.g., being 498 mm wide and 285 mm deep.

The ADSL-LTs and the LPFs are dimensioned as four lines per card. As such, a basic shelf supports forty-eight ADSL lines in a physical configuration shown in FIG. 1.

Figure 1B:
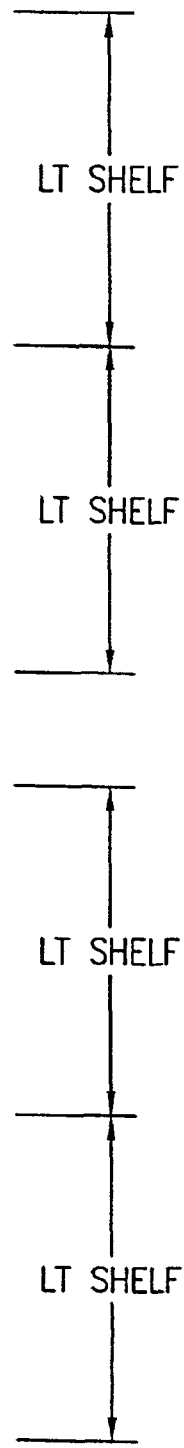
FIG. 1B shows a standard configuration of xDSL shelves in a Central Office (CO) rack, according to the present invention.
Figure 1C:
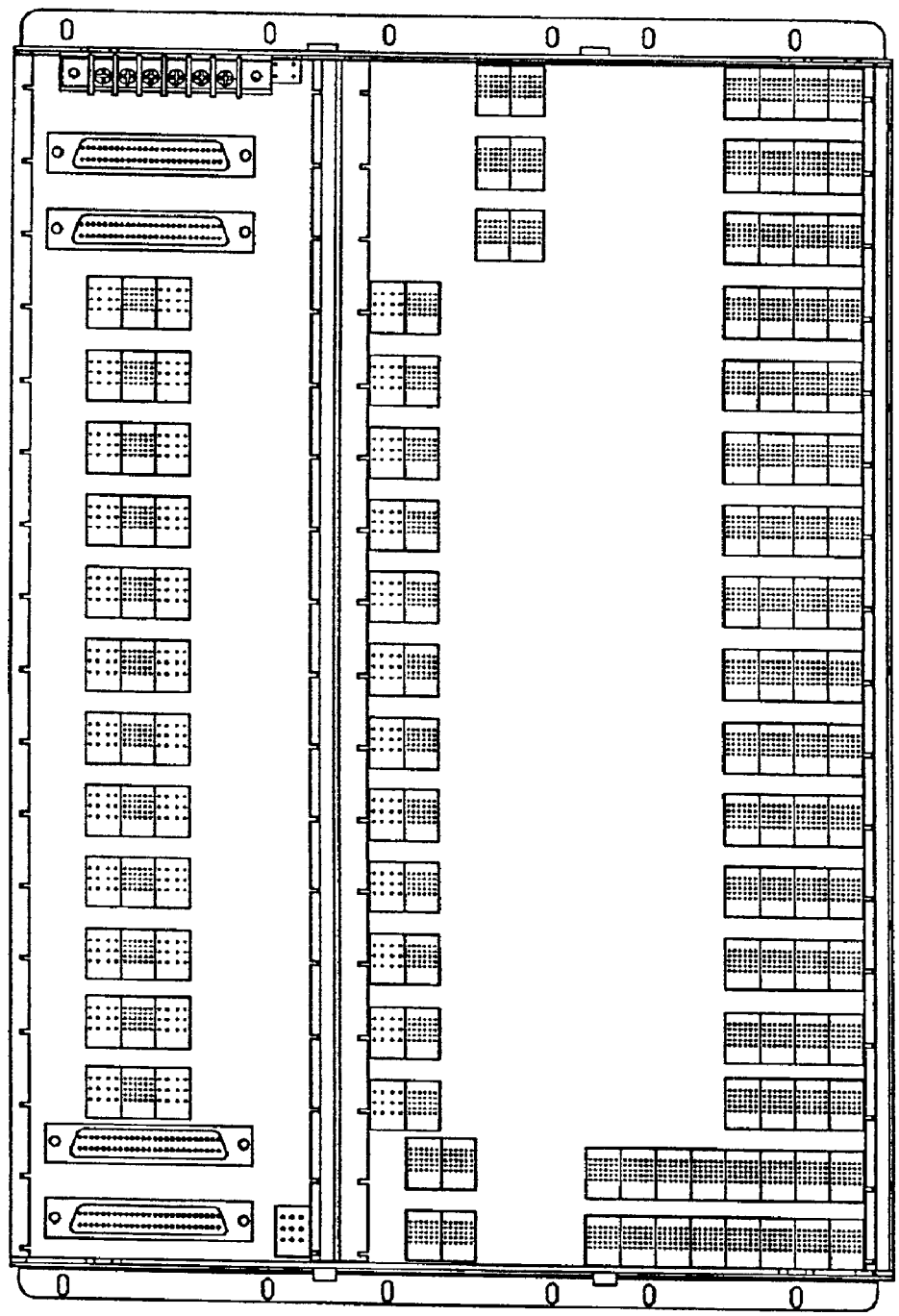
FIG. 1C shows a shelf without cards, with various connectors for connection to the backplane, a terminal block, etc.
Figure 1D:
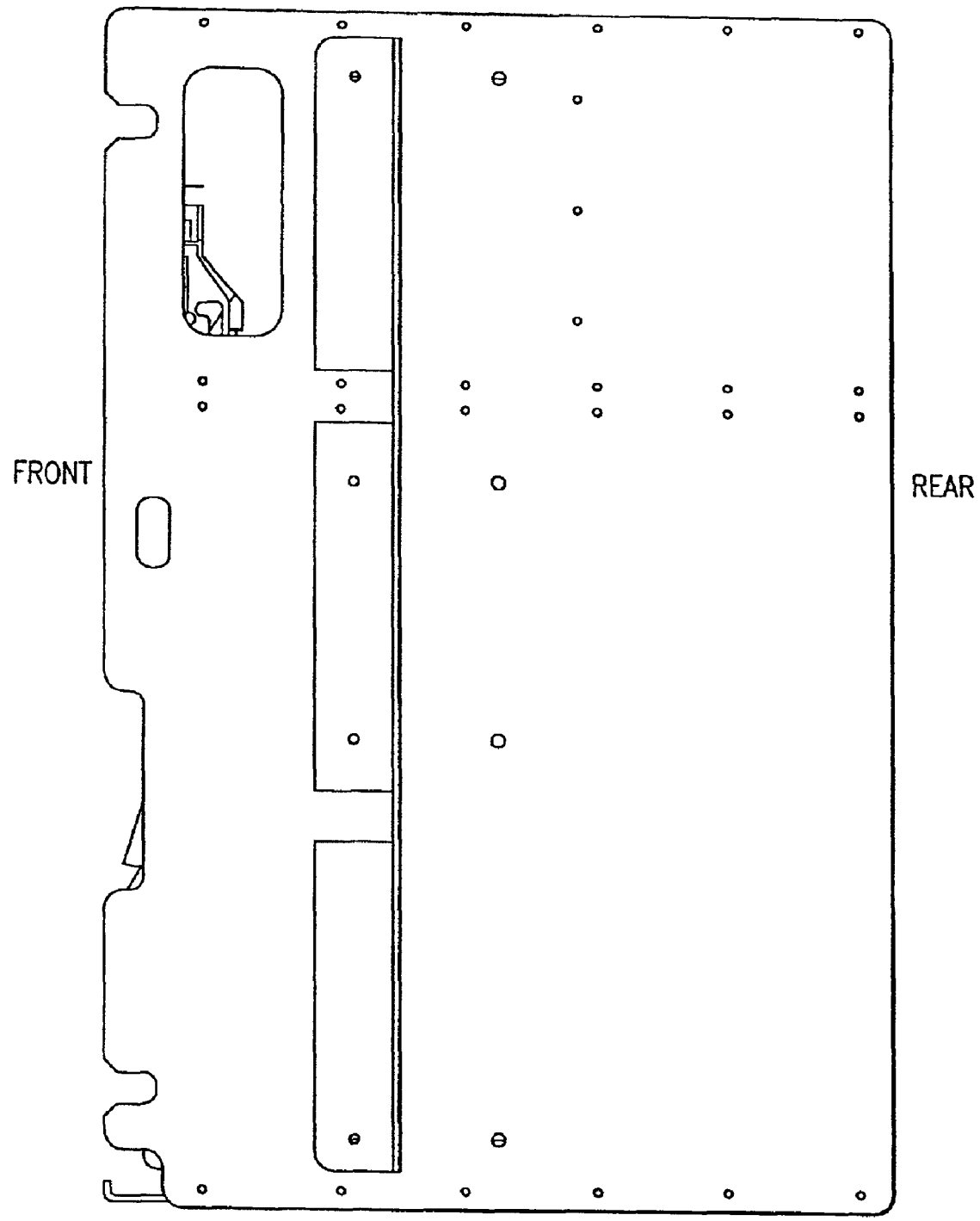
FIG. 1D shows a side view of a shelf, according to the present invention.
Figure 1E:
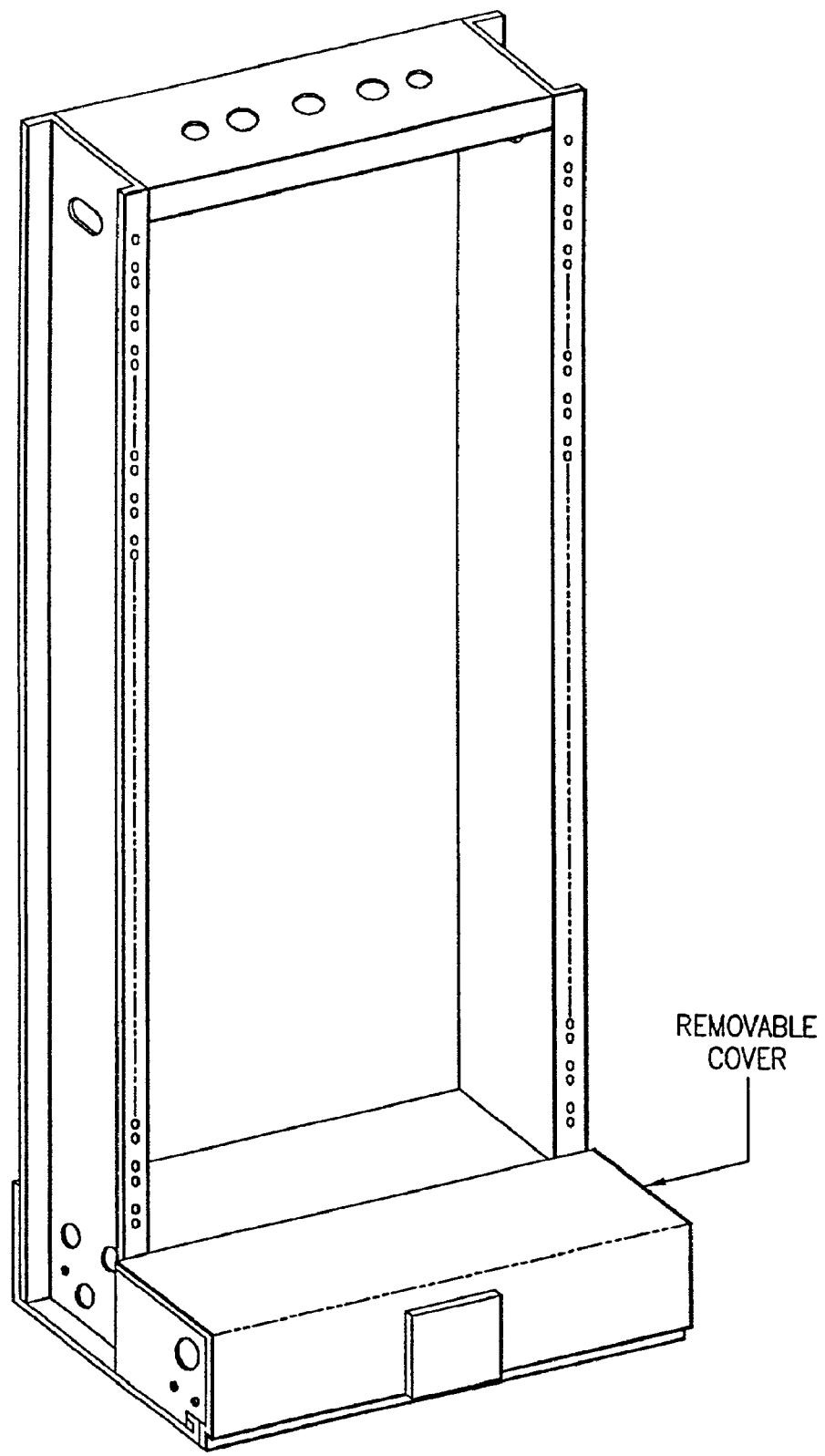
FIG. 1E shows a rack, according to the present invention, for housing a selected number of shelves, according to the present invention.

FIG. 1A shows a front view of an actual shelf with redundant NT cards, 12 LT cards, 12 corresponding LPF cards, and an ACU card all inserted therein. FIG. 1B shows a plurality of shelves mounted in a central office rack, such as shown in FIG. 1E, in a standard configuration for serving 192 ADSL lines. Up to four adjacent racks can share the same feeder by using extension units installed in place of NTs, as explained below in connection with FIG. 6. In that case, a single, optionally-protected NT card can support up to 576 ADSL lines. FIG. 1C shows the shelf of FIG. 1A without any cards installed and shows the connectors installed in the backplane, into which mating connectors on the cards are insertable by sliding the cards into the slots shown. In this way, front-access-only is achieved. A side view of the shelf is shown in FIG. 1D.

It should be realized that without modification the LTs could be located in the upper portion and the LPFs in the lower portion. Similarly, the various power and connection sections can be located other than as shown exactly in FIG. 1. Thus, the ATM subscriber access multiplexer (ASAM) shelf described above, although unique, can have additional as well as other physical and packaging arrangements to fit particular applications. In addition to the above-described front-access-only shelf compatible with both U.S. and international racks, the above-described shelf facilitates high density, i.e., small volume per line design. Also included is a practical high-speed (155–622 Mb/s) backplane data bus. It contains a simple, flexible shelf ID (identification) mechanism. Connectorization and wiring is designed for future BITS capability. It satisfies both U.S. and European electromagnetic compatibility (EMC) requirements. It includes card arrangement for NT and LT cabling for TWP, coaxial, or fiber.

As suggested above, it can be utilized as a full-sized LT shelf for maximum density and minimum cost, as shown in FIG. 1B for a CO, or as described more fully below in connection with FIG. 9 as a mini-sized ("RAM") shelf for small remote sites.

The POTS lowpass filters (LPF) 24 of FIG. 1 can be passive filters that are contained as shown in separate units for ensuring POTS immunity to xDSL failures, maintenance and "churn" as well as for lower digital/analog crosstalk. In other words, an LT card or any other aspect of the ADSL channel can be maintained without disturbing the POTS. Consequently, overall performance is increased.

Figure 2:
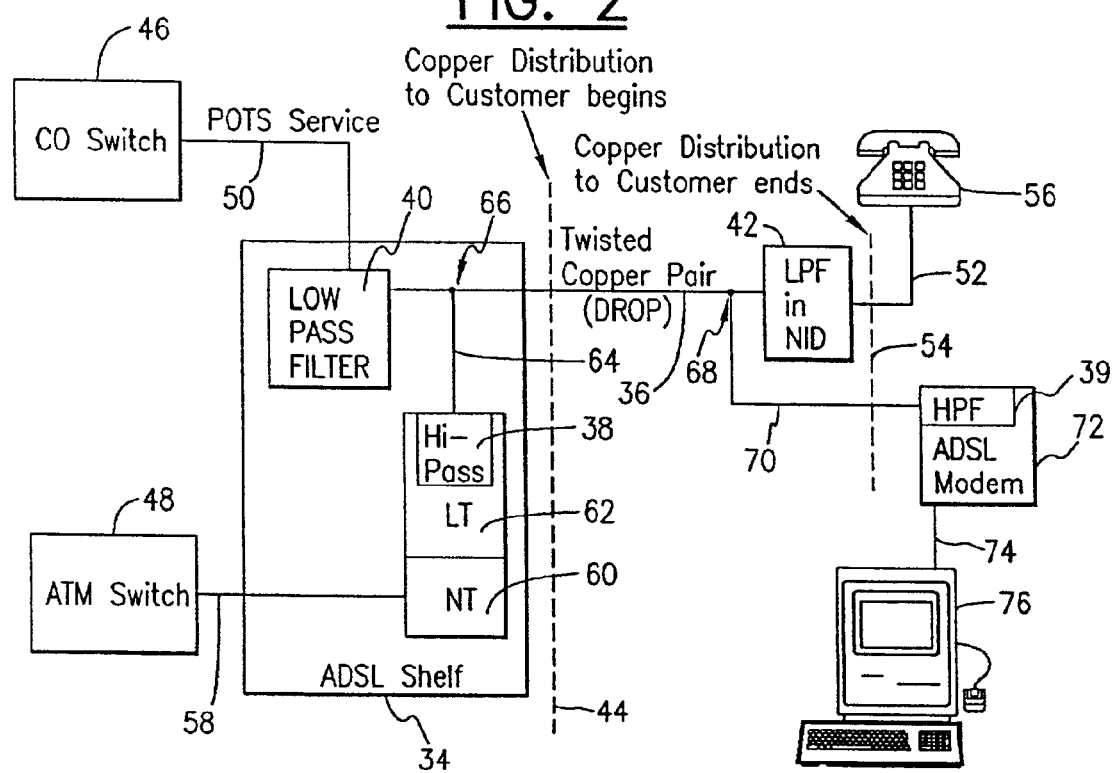
FIG. 2 shows a functional block diagram of the present invention whereby high speed packetized data in, e.g., ATM format is combined with traditional POTS service, e.g., in an xDSL shelf which may be an ADSL shelf in the embodiment illustrated for providing the means whereby POTS lifeline services on a twisted copper pair are overlaid with high speed digital services for communicating high bandwidth services to a customer's premises.

A functional block diagram of an LT/LPF pair from the group 14, 24 of FIG. 1 is shown serving a single copper pair 36 in FIG. 2. Although only a single twisted copper pair 36 is shown, it should be realized that the preferred embodiment includes four twisted copper pairs per LT/LPF card pair. In other words, the LT/LPF blocks shown within the ADSL shelf section 34 will be replicated four times for each such LT/LPF pair shown in FIG. 1 (See the LT card of FIG. 10).

As seen in FIG. 2, an ADSL data stream formatted as ATM cells are transported over the copper pair 36 formerly used for telephony only (POTS service) in an overlay fashion, through the use of highpass filters 38, 39 and lowpass filters 40, 42 at both the ADSL shelf to the left of a dash line 44 and at the subscriber premises on the right side of the line 44. The line 44 signifies the place where copper distribution to the subscriber begins. Normally, the ADSL shelf section 34 will be part of a shelf 10 such as shown in FIG. 1A within a rack in a central office, as shown in FIG. 1B, within which office also resides a CO switch 46 and a broadband switch such as a packet switch, e.g., an ATM switch 48. The broadband switch could be located elsewhere, such as further upstream. The CO switch 46 is for connection to a switched telephone network, such as the public switched telephone network (PSTN) for providing POTS service on a line 50 to the twisted copper pair 36 and into customer premises via copper wires 52 at the customer end, as shown in FIG. 2 on the right-hand side of a dashed line 54, signifying a customer premises boundary, for connection to a telephone 56 for normal voice communication. However, the ADSL shelf 34 could just as easily be located in a remote cabinet in association with a DLC (Digital Loop Carrier) shelf, as described further below, with both ATM traffic and POTS being carried to it, e.g., by a SONET (Synchronous Optical NETwork) transport product.

The ATM switch 48 is for connection to an ATM network which provides connection to various services, including Internet Service Providers (ISPs) and other high bandwidth service providers. The ATM switch 48 provides ATM formatted data on a line 58 to a network termination (NT) card 60 which is, in turn, connected to a plurality of ADSL line termination (LT) cards such as the card 62 which includes the highpass filter 38 for providing the ADSL signal on a line 64 to a junction node 66 for combination with the normal telephony signals provided by the lowpass filter 40. The node 66 thus forms a means for frequency division multiplexing, i.e., joining the POTS service on the line 50 at a low frequency with the high bandwidth services provided on the line 58 and converted to ADSL by the LT 62 at a higher frequency for passing through the filter 38 and on to the line 64 for combination with the telephony service at the node 66 of the twisted copper pair 36. FIG. 12 (not to scale) shows an example of bandwidth allocation for POTS service at baseband, e.g., 0–4 kHz, with DMT technology used for the ADSL signal between 40 kHz and 1.1 MHz. In this case, the spectrum allocated for use downstream is much larger than that allocated for upstream, and hence the designation as "asymmetrical" digital subscriber line (ADSL).

Referring back to FIG. 2, at the customer end 54, a node 68 allows the signal on the line 36 to be split off on a line 70 before passing a telephony signal through a lowpass filter 42 in a Network Interface Device (NID) 10 (not shown). The NID can be an enclosure (box) for mounting on the wall of a house, and both the node 68 and LPF 42 can be inside the NID. The line 70 is connected to an ADSL modem 72 which highpass filters the signal on the line 70 and demodulates and decodes the ADSL signal for providing a high bandwidth signal on a line 74 to customer premises equipment such as, but not limited to, a personal computer (PC) 76. The NID enclosure can be, for example, as shown in copending and co-owned patent application filed on even date herewith entitled "Apparatus for Mounting a Low Pass Filter in a Telephone Network Interface Box" having U.S. Ser. No. 08/889,928, filed Jul. 10, 1997, now U.S. Pat. No. 6,044,151.

It should be mentioned that the POTS signals in the baseband part of the signal spectrum of the signal on the line 36 of FIG. 2 can include conventional analog modem and even mechanized loop testing (MLT) signals, neither of which will be degraded by or affect the ADSL service.

The functional block diagram shown in FIG. 2 illustrates both the data and telephony paths to the customer. The shelf (basic shelf) architecture is further illustrated in FIG. 3. The basic shelf 10 includes an "IQ bus" including control leads 78, which is more fully described in copending U.S. provisional patent application Ser. No. 60/052,125, entitled "Method for Prioritized Data Transmission and Data Transmission Arrangement", filed on Jul. 10, 1997, now U.S. patent application Ser. No. 09/084,750, filed May 26, 1998, which is based on European Patent Application 97401146, filed 26 May 1997, now EP Patent Publication No. 08811853, and which is hereby incorporated by reference. As was known in the prior art, whenever a number of any kind of terminal units need to access a common medium or bus, some access grant criterion is needed, e.g., upon a grant signal, each terminal unit enters an arbitration phase based on the respective priority values assigned to the terminal unit. The problem with this is a problem of fairness, in that the terminal having a low priority might never get access. In brief, and as illustrated in FIG. 3A, the IQ bus invention makes the priority adaptable after each grant cycle, so that if a unit does not get access, its priority can be increased. In addition, the priority value can be linked to an access mode requested by the terminal unit, e.g., a Guaranteed Cell Rate GCR (CBR, VBR, ABR in case of an ATM-based bus), Non-Guaranteed Cell Rate NGCR (VBR, ABR, EBR in case of an ATM-based bus) by allocating value ranges to each access mode, increase of the priority then being limited by the boundaries of the respective ranges. For instance, five different levels of QoS classes are shown at the left-hand side of FIG. 3A, with the lower three classes having both guaranteed cell rate and non-guaranteed cell rate subclasses indicated. Naturally, the constant bit rate (CBR) and variable bit rate-real time (VBRrt) classes do not have non-guaranteed cell rate (NGCR), since they must be guaranteed. The non-guaranteed cell rates are shown grouped at the bottom of the priority mapping to the right, which shows QoS subclasses with guaranteed subclasses at the top (shaded). Nevertheless, according to the present invention, overbooking of non-guaranteed bandwidth is allowed by providing not only prioritization, as shown, but also an aging mechanism, as shown on the far right of FIG. 3A. When a terminal subscribing to a non-guaranteed class of service does not get access within a predetermined period, its priority is increased according to a selected algorithm to a value within a range corresponding to an access mode having a higher access probability. One particular and non-limiting way of defining priority values is suggested in FIG. 3A, with $2^{15}-1$ priority values defined and evenly allocated (for instance) among the QoS subclasses. As an example, for a hardened-UBR QoS class, the guaranteed cell rate (GCR) is normally defined as a number of cells per second. A period having a time defined by the inverse thereof can thus be defined as shown in FIG. 3A, indicating how the priority of the cell from the lowest subclass (Non-Guaranteed Hardened UBR) can be increased after it is not granted access to the bus after a waiting time T=1/GCR seconds. In the example shown, the priority is increased in a single step to that of the Guaranteed Hardened UBR subclass, thus statistically implementing a minimum cell rate for the lowest subclass. These teachings advantageously provide a flexible method allowing access based on a type of access mode and on agreed access parameters. The IQ bus is thus distinguished by a unique grant mechanism and fairness algorithm. It provides multiple QoS classes with multiple cell priorities per class. It features a cell aging priority mechanism, as well as a QoS priority mechanism to ensure cells comply with the class of service parameters defined in Bellcore Specification GR-1110. It is provided with fault tolerance and recovery mechanisms, allowing any fault on the multiplex bus to be quickly identified and isolated. It has a redundant extension capability as well, as described below in connection with FIG. 6. The IQ bus builds upon an earlier "I* bus" (without QoS) described in copending U.S. provisional patent application Ser. No. 60/052,141 entitled "Priority-Based Access Control Method and Arrangement", filed Jul. 10, 1997, now U.S. Pat. No. 6,105,084, issued Aug.

15, 2000, based on U.S. patent application Ser. No. 09/022, 177, filed Feb. 11, 1998, and which is based on European Patent Application 97400303, filed Feb. 11, 1997, now EP Patent Publication No. 0858035, and which is also hereby incorporated by reference.

Figure 3:
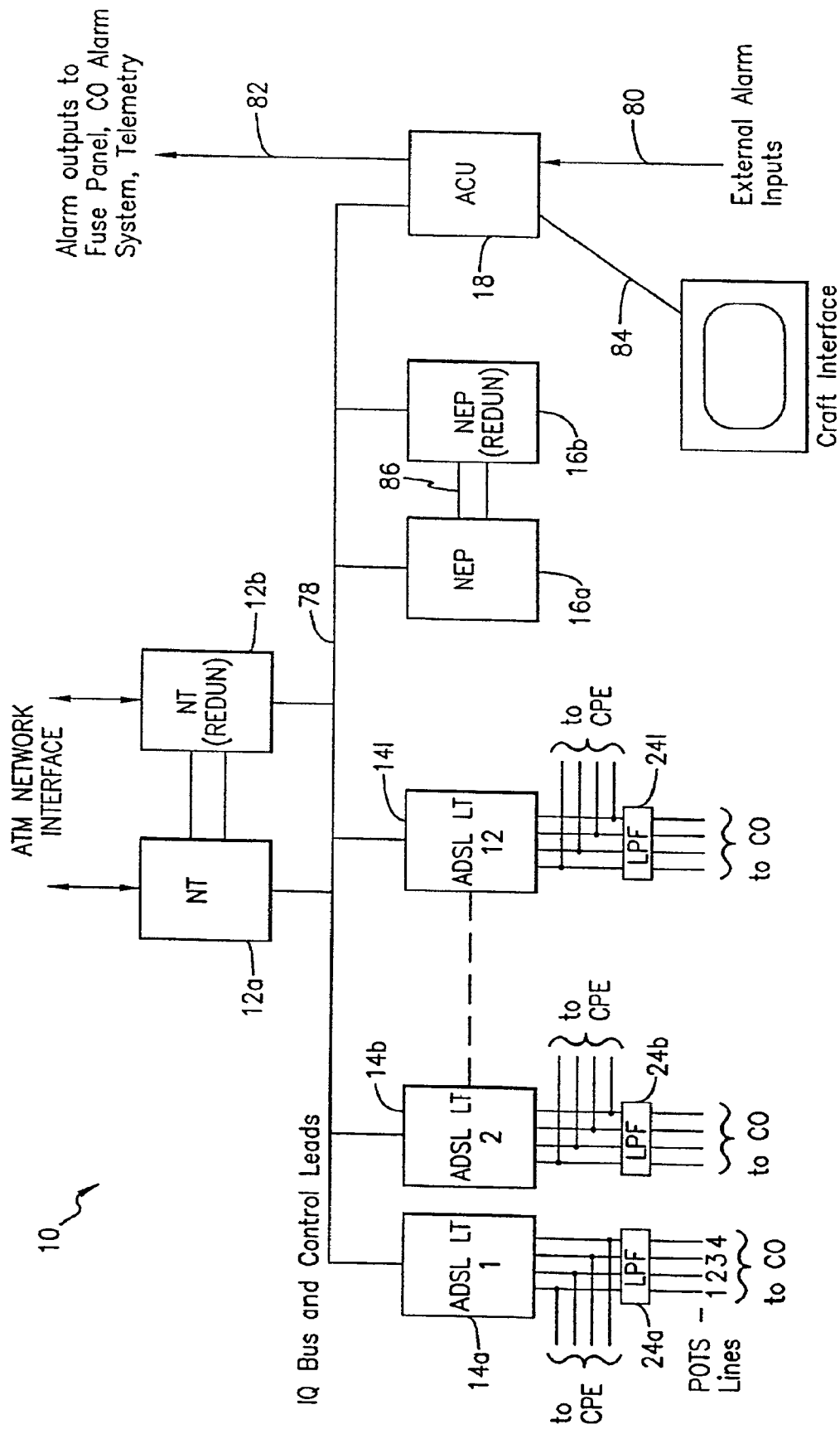
FIG. 3 shows further details of the xDSL shelf of FIG. 2 which can be an ADSL shelf, as illustrated, for serving a plurality of customer premises, in this case with up to 48 lines.
Figure 3A:
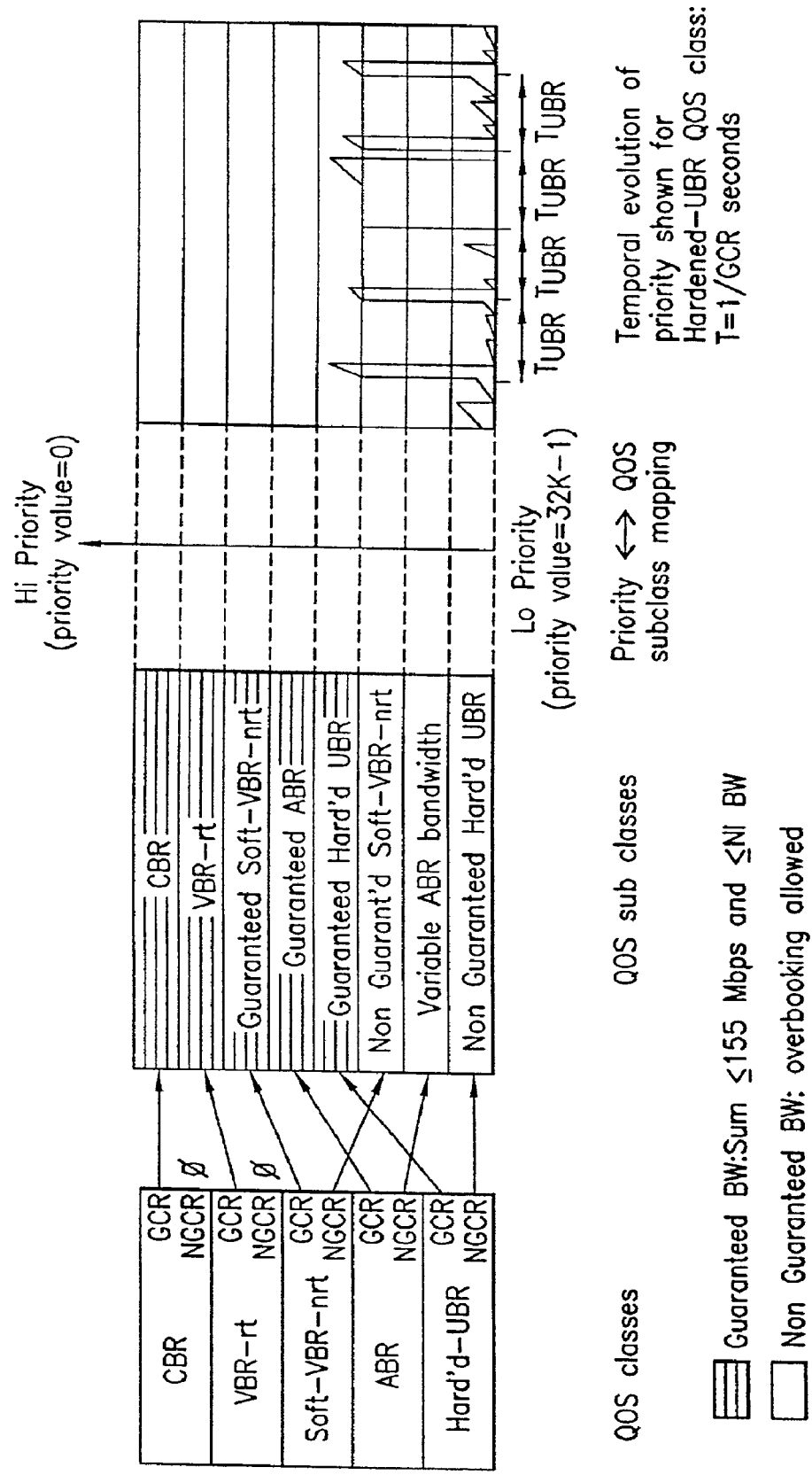
FIG. 3A illustrates a bus access method for prioritized data wherein guaranteed bandwidth and overbooking in a same QoS class is mixed with a fairness feature, according to the present invention.

As shown in both FIGS. 1 and 3, the NTs 12a, 12b can be provided in either a redundant or non-redundant configuration. In this architecture, the normal NE processing is performed by the NT, and the NT can be provided as either a SONET User Network Interface (UNI) interface, a DS-3 UNI interface or later, a DS1 inverse multiplex UNI interface. If SONET NTs are provided as redundant pairs, Automatic Protection Switching (APS) is provided using the normal 1+1 switchover mechanism detailed in Bellcore document GR-253. On SONET NTs, the physical interface (fiber) is located on the faceplate of the NT itself (see FIGS. 14C and 14D), with no need of additional interface circuitry. If, however, NTs are provided as DS-3 ports, equipment protection (without cable protection) is provided using the DS-3 I/O board 32 shown in FIG. 1 installed above the NTs in the shelf, allowing the single DS-3 facility (coax cable Tx/Rx pair) to be split and accessed by either NT (inter-NT communication arbitrates which one is active).

From the foregoing it will be appreciated that the heart of the ADSL shelf architecture is the above-mentioned IQ bus and control leads 78. The IQ bus effectively acts as a multiplexer at the same effective speed as the NT physical interface. Since ADSL-LTs provide several classes of service (as defined in Bellcore document GR-1110 and the ATM Forum Standards), a grant mechanism allows higher priority upstream cells greater access to this ATM MUX bus, in order to meet the QoS parameters required of the respective services provided. As mentioned, two methods of cell priority can be chosen to guarantee QoS requirements and relative fairness—a weighting priority mechanism (based on service guarantees) and an aging mechanism (based on time a cell has been waiting for a grant). This mechanism is unique and the subject of the above-mentioned provisional application Ser. No. 60/052,125, now U.S. patent application Ser. No. 09/084,750, filed May 26, 1998, which is based on European Patent Application 97401146, filed on May 26, 1997, now EP Patent Publication No. 0881853, which has been incorporated by reference.

The ACU 18 in FIG. 3 is shown in block diagram form in FIG. 15, and it performs the following functions: (1) collects external customer designated alarm contacts on lines 80 and forwards these events to the NT 12a via lines 78; (2) collects failure indications in the rack and forwards this information to the NT 12a; (3) receives processed alarm data from the NT and displays the alarm condition (critical, major, minor) on the ACU's faceplate as well as providing contact closures for visual and audible (and telemetry alarms) to a rack fuse panel and to a CO alarm interface via a line 82. The ACU also contains: (4) an alarm cutoff (ACO) function to silence audible indications until a new alarm is detected (as well as a remote ACO function via line 82); (5) a craft interface port 84 for controlling OAM and P functions of the ADSL NE (using a link to the processor in the NT); (6) an ethernet port for OS connection via the NEP; and (7) a lamp test function. One ACU card is provided per rack when a system spans multiple racks. An ACU is provided per NT (or redundant NT pair) when multiple systems reside in a given rack. Multiple systems reside in a given rack when a very wide bandwidth is to be served by, e.g., a single shelf. In such a case, a single shelf may use up the entire bandwidth of an OC-3 or DS-3 cable.

Figure 10:
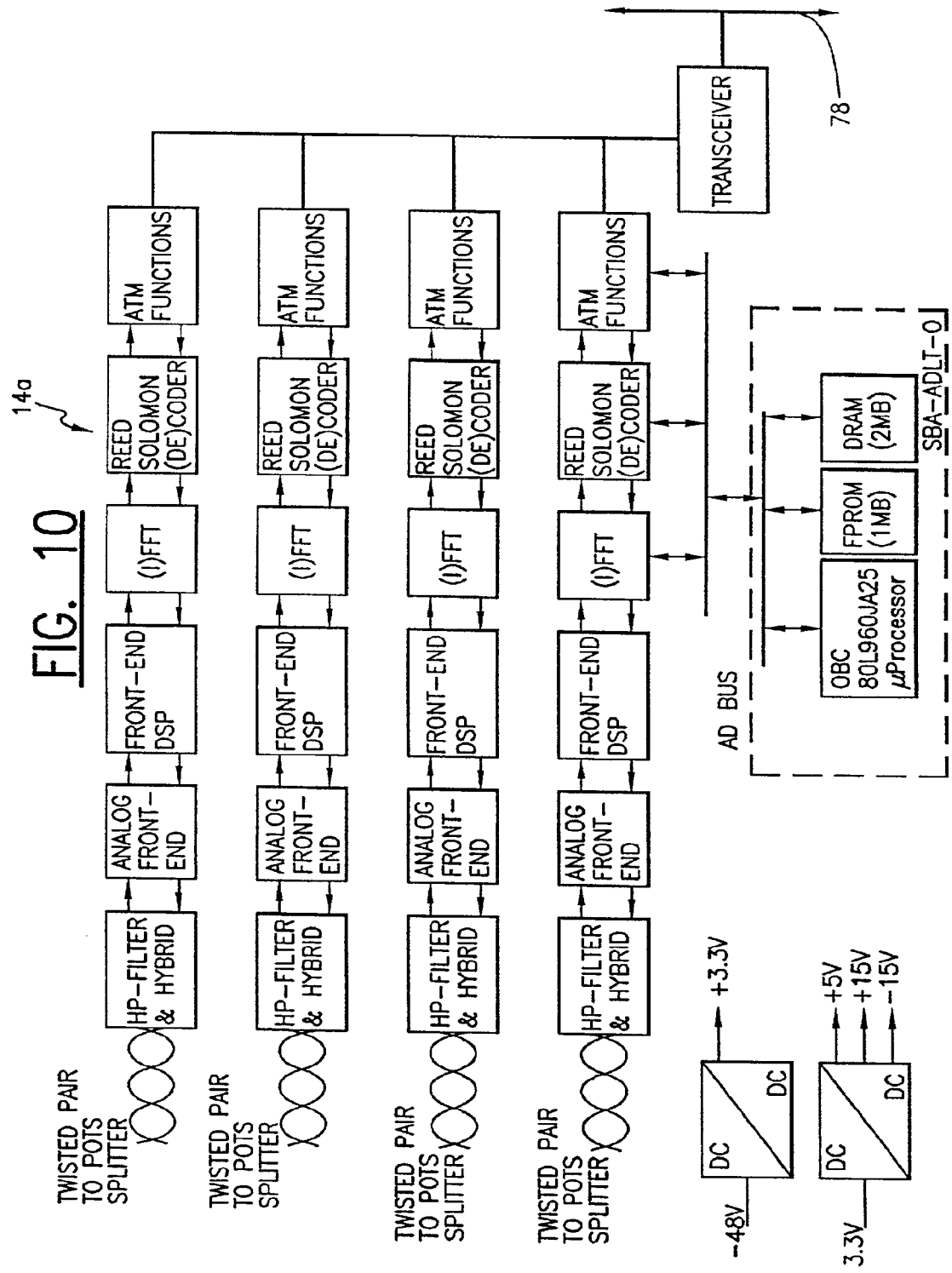
FIG. 10 shows a functional block diagram of an LT card, according to the present invention.

As shown in FIGS. 3 and 10, each ADSL LT 14a, 14b, . . . , 14l communicates with up to four remote modems (ADSL NT or ANT) at corresponding customer premises via DMT (Discrete Multi-Tone) per T1.413 (see FIG. 12), using ATM cells as the data transport format, according to the present invention. The subscriber can have a lowpass filter (LPF) 42 mounted, for example, on the outside wall of his home in an NID (Network Interface Device) box to separate the low frequency service (telephony) from the higher frequency services (ADSL). As mentioned, a way to mount such an LPF within an existing design NID is shown in copending application U.S. Ser. No. 08/889,928, now U.S. Pat. No. 6,044,151, and which is hereby incorporated by reference. The two services, once split, use different twisted pairs in the house wiring, with the ADSL pair terminating in either an ANT or directly in a PC via an NIC (Network Interface Card). ANTs, for example, can come in two types: one with an ATMF 25.6 Mb/s interface, the other with an ethernet interface (in this case the ANT packages the ethernet data as ATM cells using AAL5 (ATM Adaptation Layer 5) protocol). Both options can be provided on the same ANT, as shown in FIG. 13B.

The basic shelf 10 also contains, as shown in FIGS. 1 and 3, an optional network element processor (NEP) redundant pair 16a, 16b, which communicates over the IQ bus 78 mechanism and communicates with its redundant partner over separate leads 86 to determine which one is active. The NEP can terminate signaling channels for SVC (switched virtual connection) services or PVC (permanent virtual connection) services and can terminate the ACU ethernet port.

Presently, the two NEP cards 16a, 16b of FIGS. 1 and 3 are not being implemented, although there are two slots reserved for it. It is planned to be available later for terminating and processing SVC (Switched Virtual Circuit) signaling channels, and for providing an ethernet termination for the ACU ethernet port. There are no other functions presently planned for the NEP cards.

As shown in FIG. 4, the basic shelf 10 may also be used as a "hub" shelf 90, with one or more ADSL-LT slots populated by DS-3-LTs or other cards such as OC-3, DS-1 inverse mux LTs, etc. Each DS-3-LT connects the hub to a concatenated "remote" ADSL shelf 96, 98, as shown in FIG. 4. In such cases, for the hub, the "LPF" modules above the DS-3-LTs are replaced with DS-3-LT interface modules (one type for nonredundant operation and another type for redundant DS-3 "equipment protection" operation). A third type of DS-3 LT interface module can be provided for redundant IQ bus operation, with the DS-3-LTs being on separate shelves for reliability purposes (due to there being only one IQ bus per shelf). The present architecture uniquely provides for each of these redundancy options.

Figure 4A:
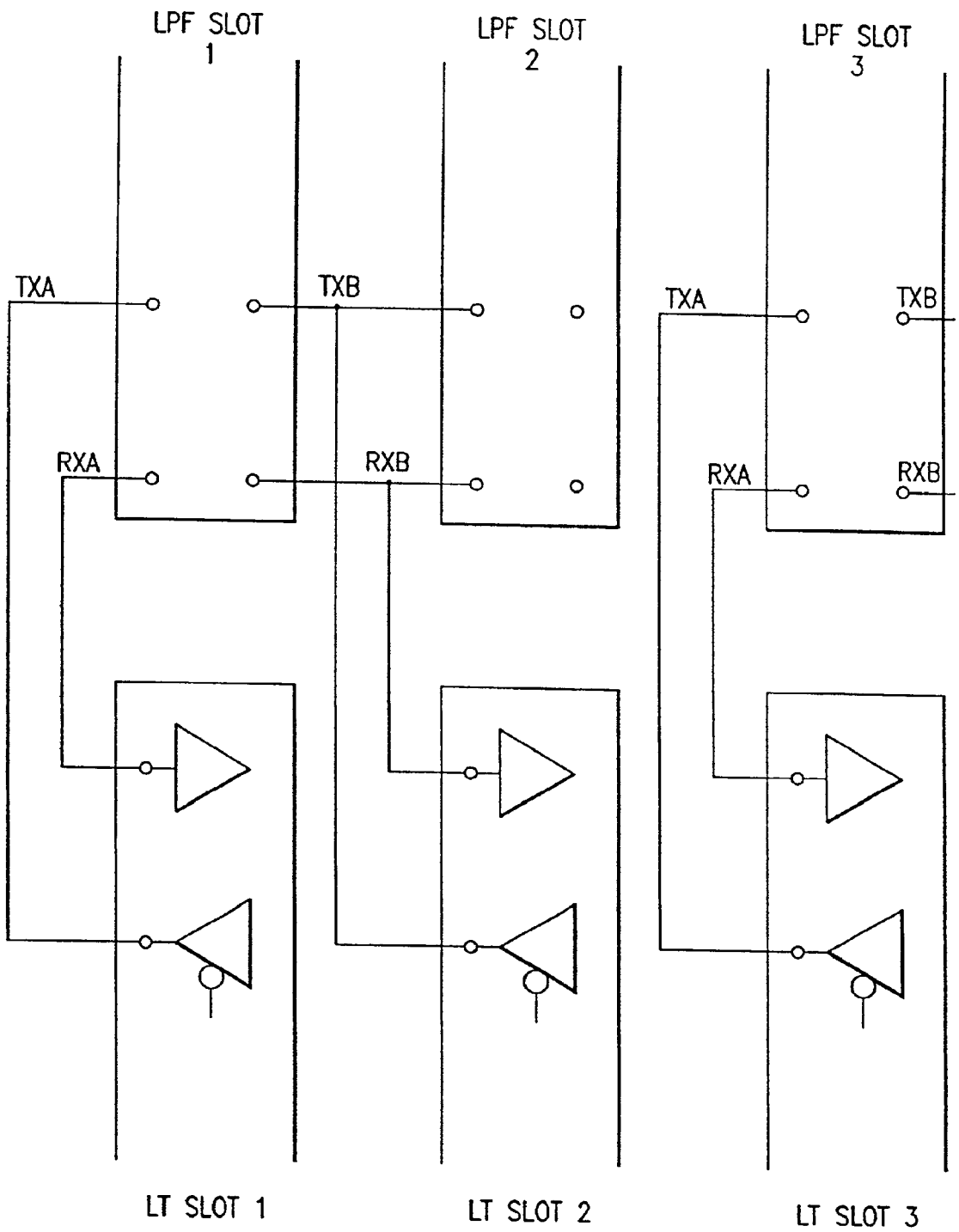
FIG. 4A shows LT-LPF BPA wiring and LT-BPA transceivers for supporting the "hub" applications with DS-3 links to "remote" shelves, according to the present invention.
Figure 4B:
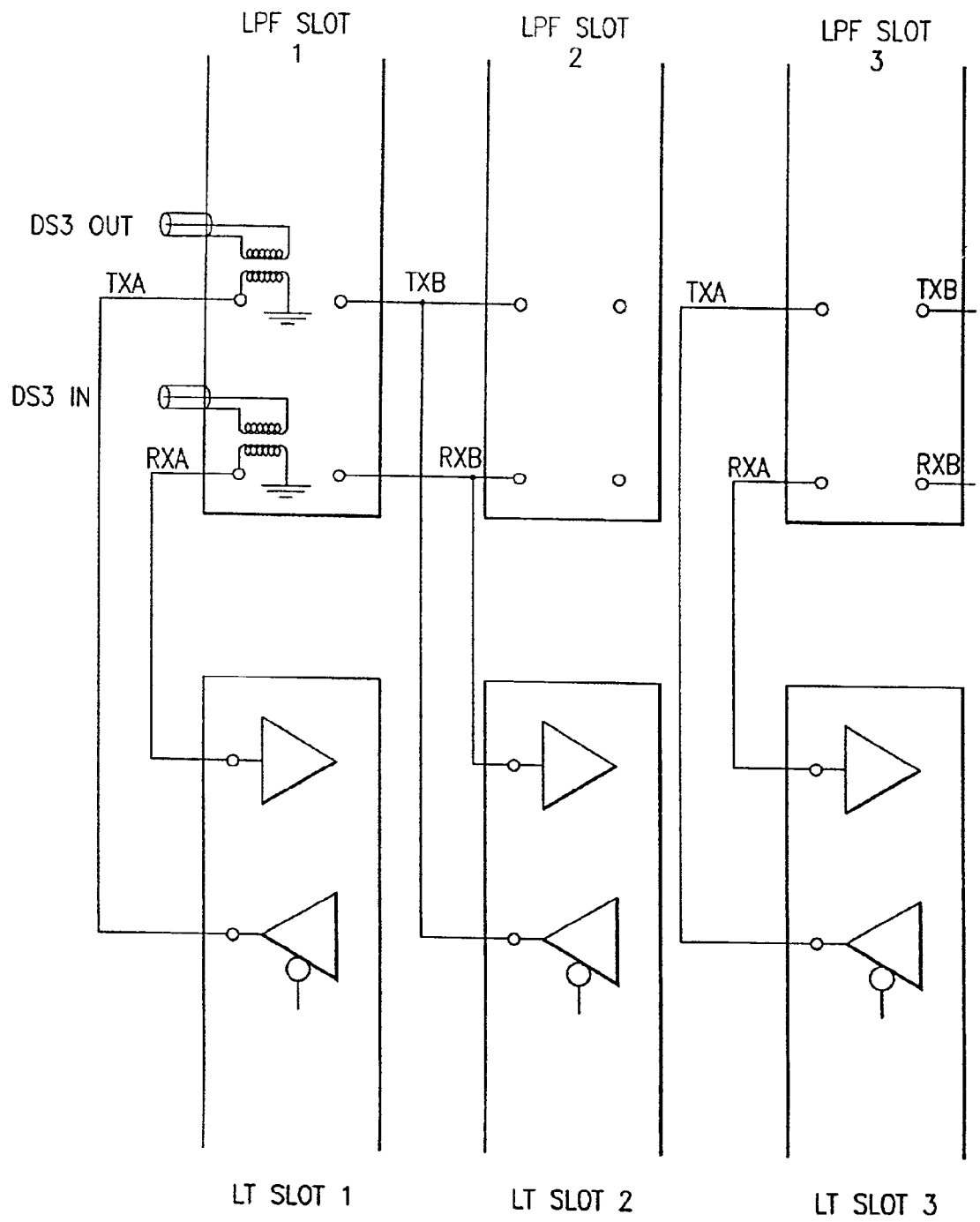
FIG. 4B shows wiring with non-redundant DS-3 LT card installed for the "hub" application, according to the present invention.

As shown in FIG. 4A, the LT-LPF backplane wiring is shown with LT transceivers. In this case, the LPF and LT cards can be configured for redundancy of the LT cards to be inserted in the LT slots in either a same shelf or in separate shelves. For example, in FIG. 4B, a non-redundant option LT is shown with a DS-3 interface inserted in LPF slot 1, wherein input and output DS-3 coax cables from a CO switch are connected to a DS-3 interface card for insertion in LPF slot 1, which is connected through the backplane to a DS-3-LT card for insertion in LT slot 1, such as the DS-3-LT card 92 of FIG. 4. The lowpass filter function is carried out at the remote shelf 96 of FIG. 4 where a DLC is available. The configuration shown in FIG. 4B for LT slot 1 and LPF slot 1 could also be used in connection with FIG. 4E, as explained below.

Figure 4C:
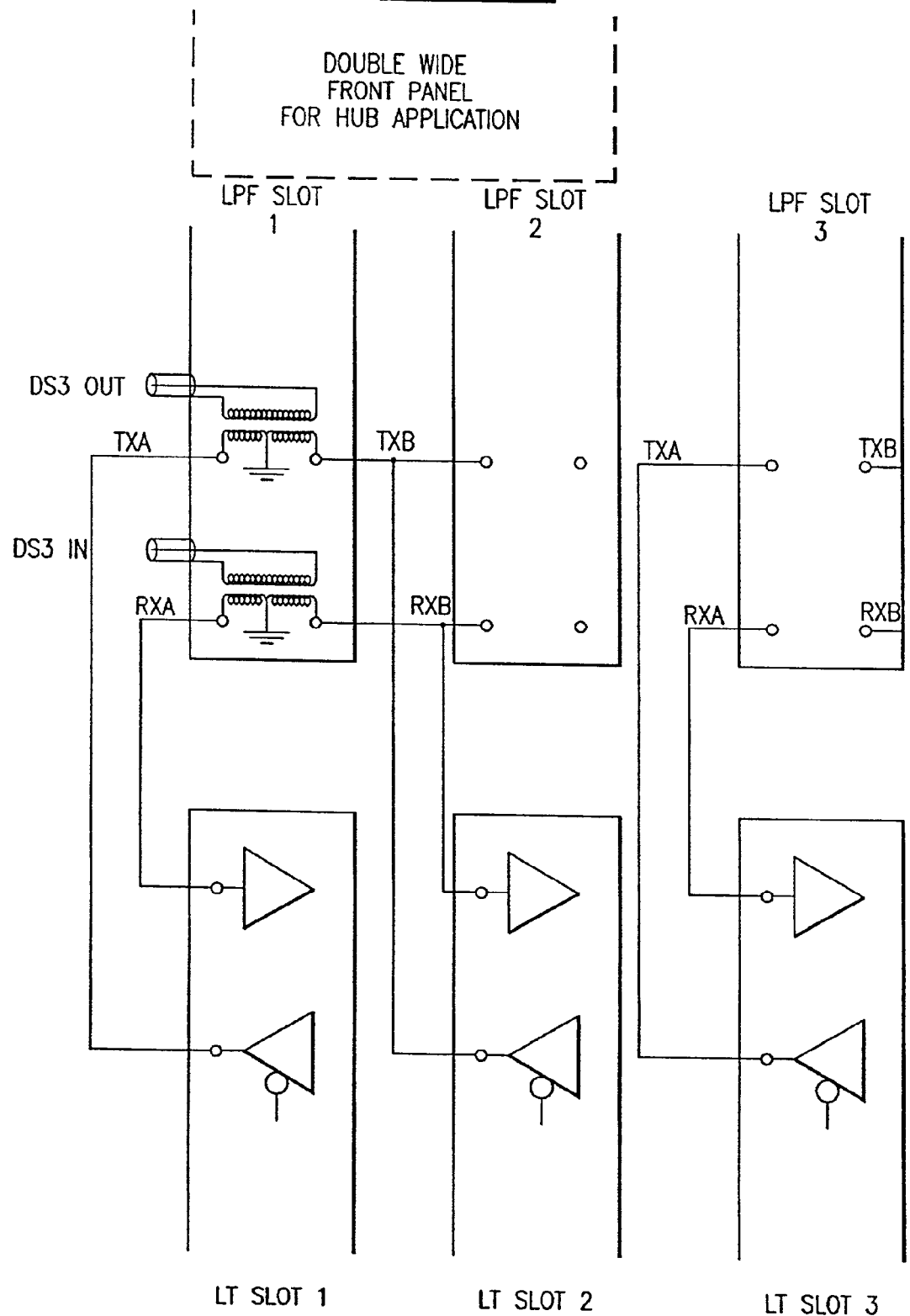
FIG. 4C shows redundant DS-3 LTs on the same shelf in a "hub" application, according to the present invention.

FIG. 4C shows an application with redundant DS-3-LT cards for insertion, e.g., in LT slot 1 and LT slot 2 of a given shelf. In that case, a different kind of DS-3 I/O card is used, double wide as shown, with a center tapped transformer on the card which is connected both to the transmit (TXA/TXB) and to the receive (RXA/RXB) backplane wiring associated with both LPF slot 1 and LPF slot 2. The NT controls which LT slot is to be active.

Figure 4D:
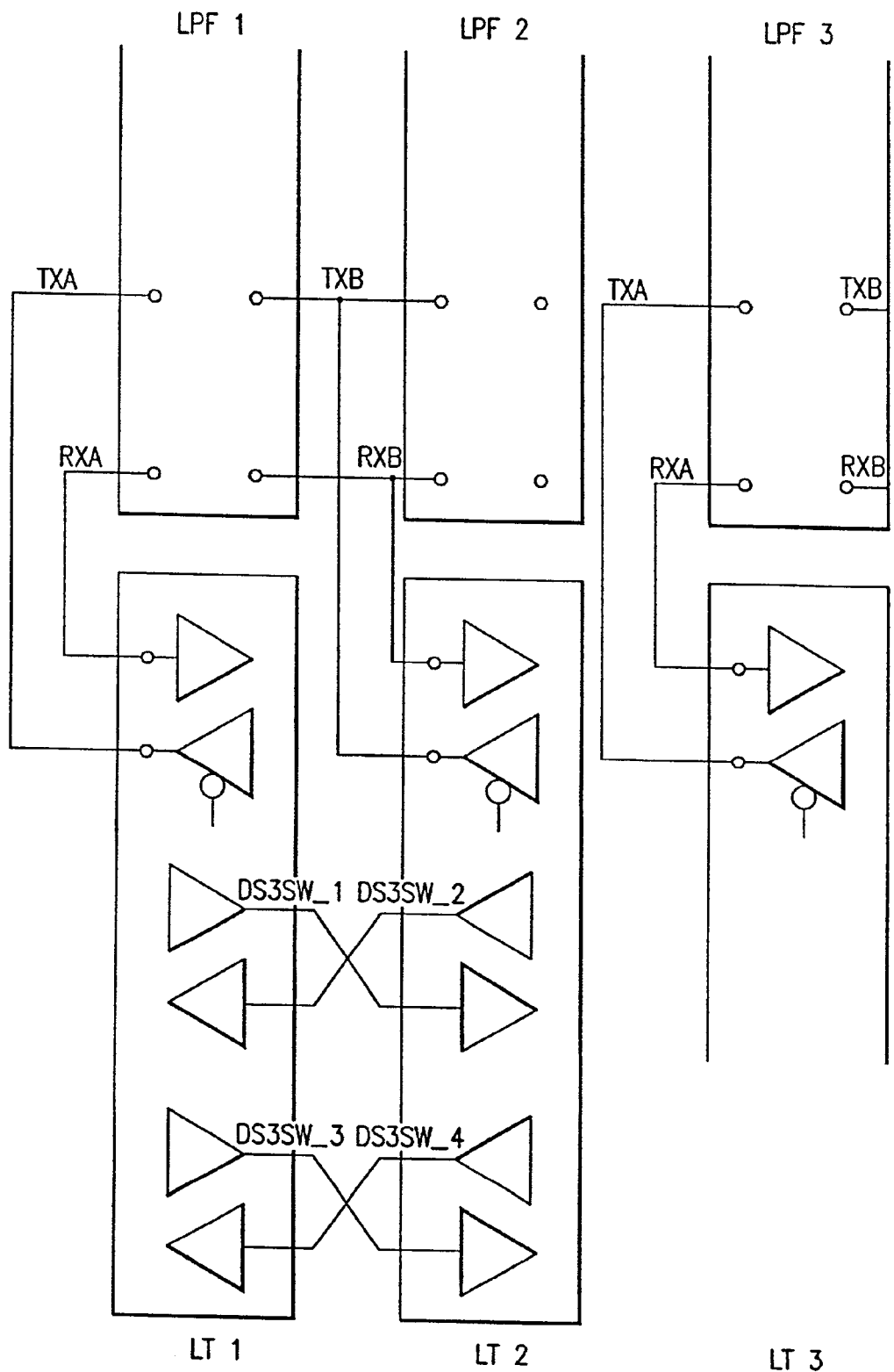
FIG. 4D shows switch signal wiring for redundant DS-3 LTs in the same shelf for a "hub" application, according to the present invention.

FIG. 4D is similar to FIG. 4A but additionally shows arbitration interfaces between redundant DS-3-LTs.

Figure 4E:
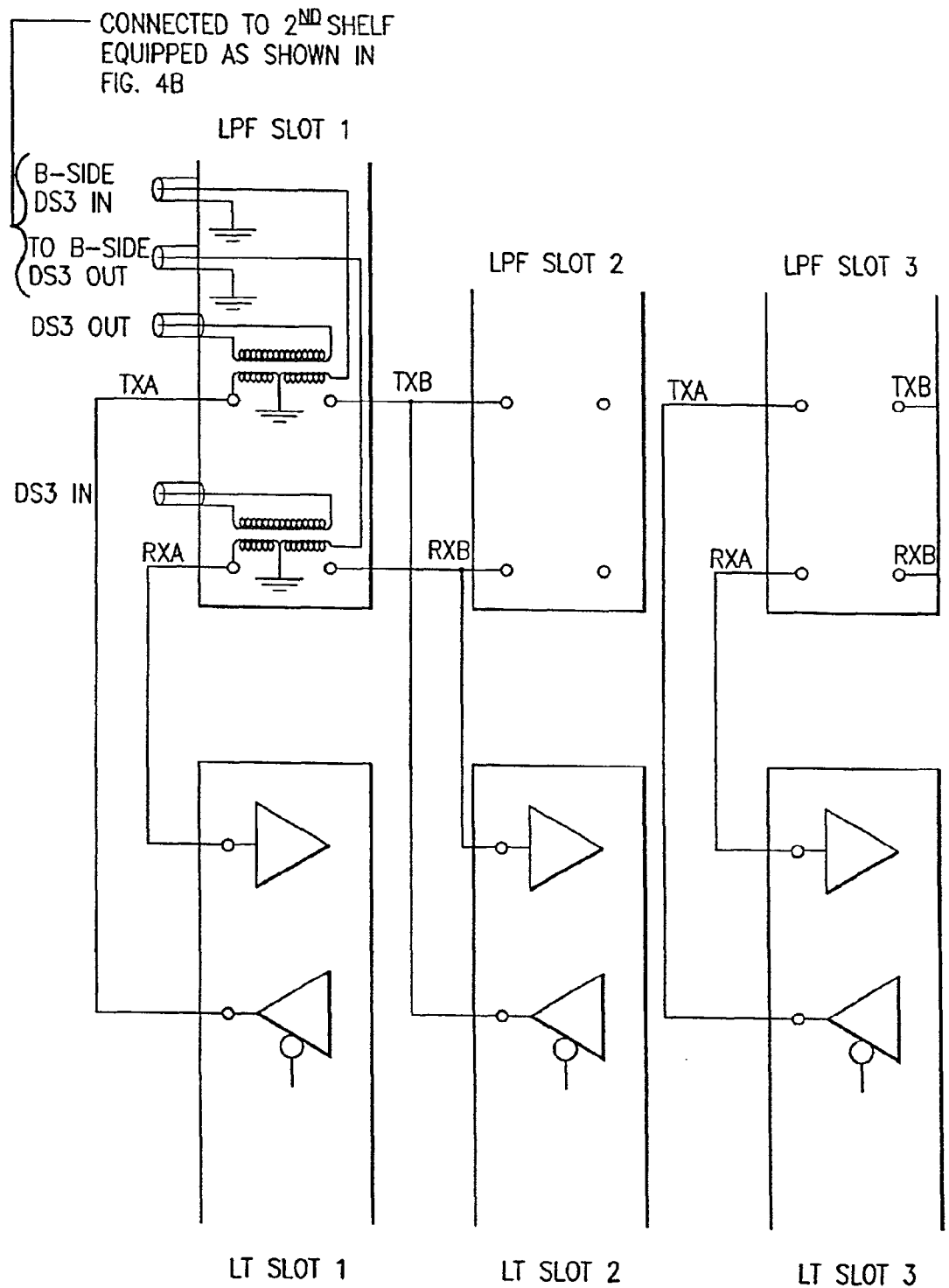
FIG. 4E shows a solution for DS-3 LT card redundancy in separate shelves for a "hub" application, so as to provide IQ bus redundancy, according to the present invention, where only a single IQ bus is provided per shelf.

As suggested above, since there is only one nonredundant IQ bus per shelf, the equipment protection implied by FIG. 4C with A and B redundant DS-3-LT cards in slots 1 and 2 will be ineffective if the IQ bus itself has a failure. If it is desired to avoid this sort of failure, a different kind of redundancy in the DS-3 cards can be provided, as shown in FIG. 4E. In that case, half of the transmit and receive signals are used in the shelf, and the other half can be routed to a different shelf, instead of slot 2 in the same shelf. The top two cables shown in FIG. 4E would thus be routed to another shelf and be connected into, e.g., the DS-3 out and DS-3 in transformers shown in FIG. 4B in another shelf. The DS-3 out and DS-3 in cables of FIG. 4E would go to the CO switch or other network element.

As will be observed in FIG. 4, an ADSL shelf 90 may have both ADSL-LTs 14a and aggregate type LTs such as the DS-3-LTs 92, 94 shown. Service classes in both cases are provided for subscribers by separate buffers per service class (CBR, VBR, UBR, etc.), each contending for upstream access to the IQ bus via the control leads and the grant mechanism based in part on the priority assigned to each upstream cell. In the case of aggregate LTs, such as shown in the hub 90 of FIG. 4, the service class buffers have a cell priority equal to the sum of the aggregate cell priorities in each buffer (or even some percentage), in order that the remote subscribers are assigned a fair share of the hub's operating bandwidth. In times of bursty upstream traffic, congestion and DS-3-LT buffer overflow is managed by limiting the DS-3 link bandwidth and allowing temporary buffer fill in the remote ADSL-LTs (until such time that the traffic peak subsides). It is noted that POTS interfaces are not shown in FIG. 4 but would normally be provided, e.g., by DLCs adjacent or incorporated in the Remotes 96, 98.

FIG. 5 shows the hub 90 of FIG. 4 located in a central office 100 which may also include a CO switch 102 and an ATM switch 104. The CO switch is connected to a public switched telephone network (PSTN) 106 and the ATM switch to an ATM network 108 which is, in turn, connected to other services 110 which may include various Internet service providers 112, . . . , 114. As illustrated in FIG. 4, the hub shelf 90 may be populated by both ADSL LT cards such as the card 14a and various other cards including DS-3 LT cards 92, 94. Four copper pairs emerging from the ADSL LT card 14a of FIG. 4 are illustrated as a plurality of copper pairs 116 in both FIGS. 4 and 5. These leads provide an ADSL link directly between the hub and the various customer premises illustrated, including a customer premises 118 shown in detail. If the shelf 90 were used exclusively with ADSL LTs 14, such as shown in FIG. 1, all of the subscriber lines would be like the lines 116 without using the shelf 90 as a hub and without the remotes of FIG. 5. In other words, there would be twelve groups of 4 POTS plus ADSL lines 116 serving 48 different customer premises. The implementation of FIG. 5 provides for many more customer premises served by a single shelf, but with the accompanying increased competition for upstream bandwidth. This can be tolerated in cases where the majority of subscribers are using lower quality of service.

A lowpass filter 120 is mounted in a network interface device arrangement (not shown) for terminating the subscriber line at the customer's premises. It filters out all but the low frequency telephony signal from the copper pair and provides it on a line 122 to a traditional telephone 124 for voice communications. It also filters high frequency dial pulse or ring trip transients so that they do not interfere in the upstream direction with the high-speed data traffic. A second copper pair connected before the lowpass filter, as shown, is provided to an ADSL modem 126 which, after highpass filtering, demodulates and decodes the ADSL signal and provides output bits on a line 128 to a user terminal 130 such as a personal computer, Internet computer, etc., e.g., for Internet access or for access to other high bandwidth services 110. It should be realized that the ADSL modem also operates in the reverse (upstream) direction, albeit in a much narrower bandwidth, to encode and modulate bits onto the ADSL line from the subscriber to the ATM network as per ANSI T1.413 (see FIG. 12).

The remote shelves 96, 98 of FIG. 4 are also shown in FIG. 5 connected to various customer premises, which are similar to premises 118.

Figure 6:
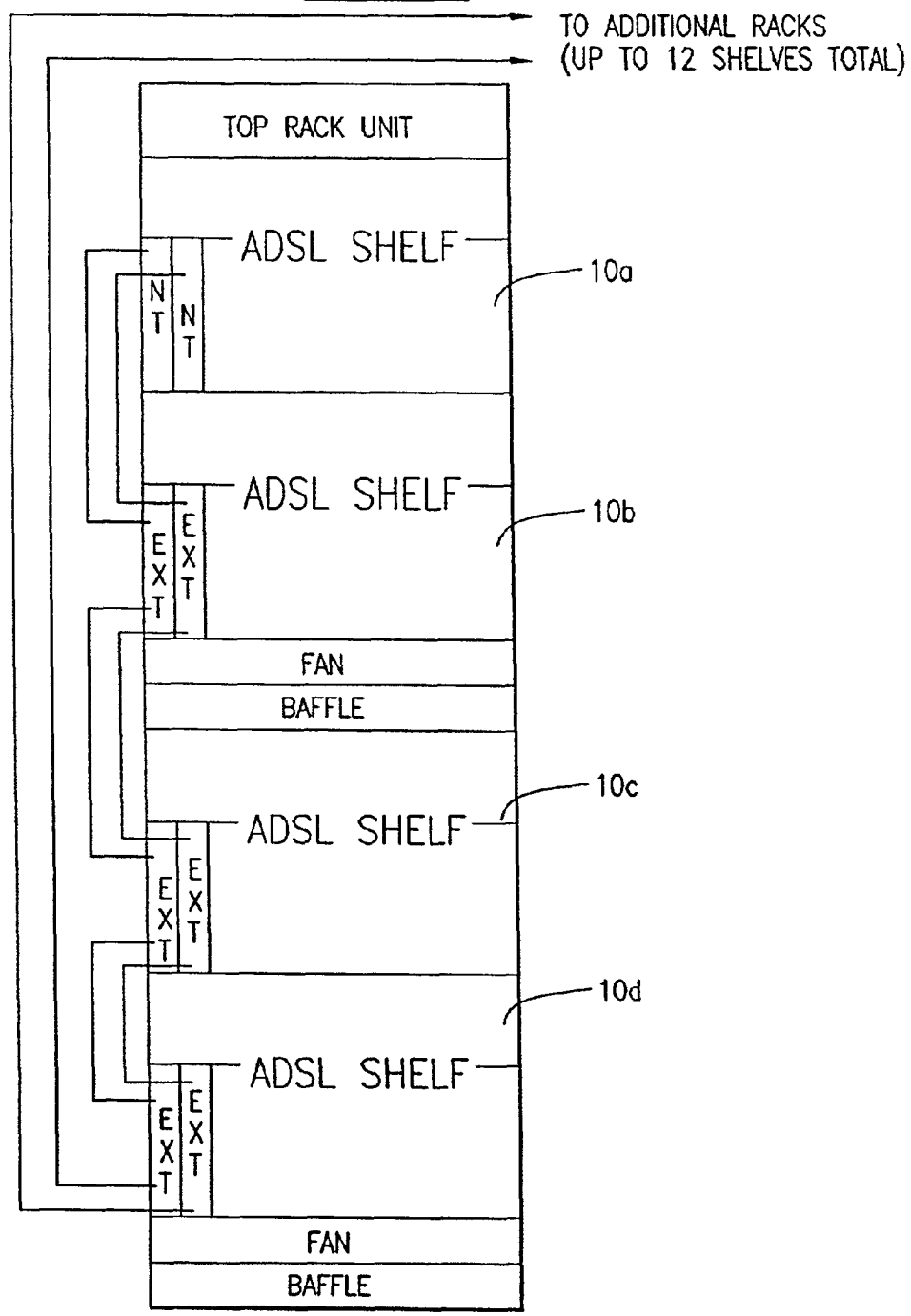
FIG. 6 shows four xDSL shelves in one rack of an ASAM system; the shelves may be ADSL shelves as illustrated, for use with redundant IQ bus extender cards (EXT) in an "A/B" bank switchover scheme to extend the IQ bus to additional shelves to serve, e.g., with three such racks, up to 576 subscribers.

FIG. 6 shows in detail the above-mentioned feature of the present architecture whereby a plurality of ADSL shelves 10a, 10b, 10c, 10d such as shown in FIG. 1 can be daisy-chained together in a rack by means of an extender card (EXT) in each subsequent shelf. The extender card function is to effectively extend the IQ bus from shelf to shelf (daisy-chained, e.g., to a maximum of twelve shelves altogether), allowing up to, e.g., 576 ADSL subscribers accessed to the system. In other words, the extender card allows an NT card in a first shelf to act as an NT card for another shelf or a plurality of other shelves. I.e., in this case, three racks with altogether twelve daisy-chained shelves. The extender cards can be mounted as shown in FIG. 6 in the NT slots of subsequent shelves and may be redundant. In that case, any failure of an NT or extender card bank switches all LTs from the "A" NT/extender string to the "B" string. The active string then assumes control of each shelf's IQ bus. The IQ bus itself (within each shelf) is not redundant, but meets reliability requirements, as the NT has the ability to remove each LT from the IQ bus (disable) to isolate a fault and remove it from service.

As suggested above, the POTS lowpass filters can be provided for different options including "integrated" in a CO shelf for maximum packaging density, minimum cabling and installation complexity and minimum cost as described above or "separate" (remote, non-integrated) for regulatory flexibility and access to existing (crowded) DLC cabinets.

Figure 7D:
FIG. 7D shows an optional separate splitter shelf, according to the present invention.
Figure 7A:
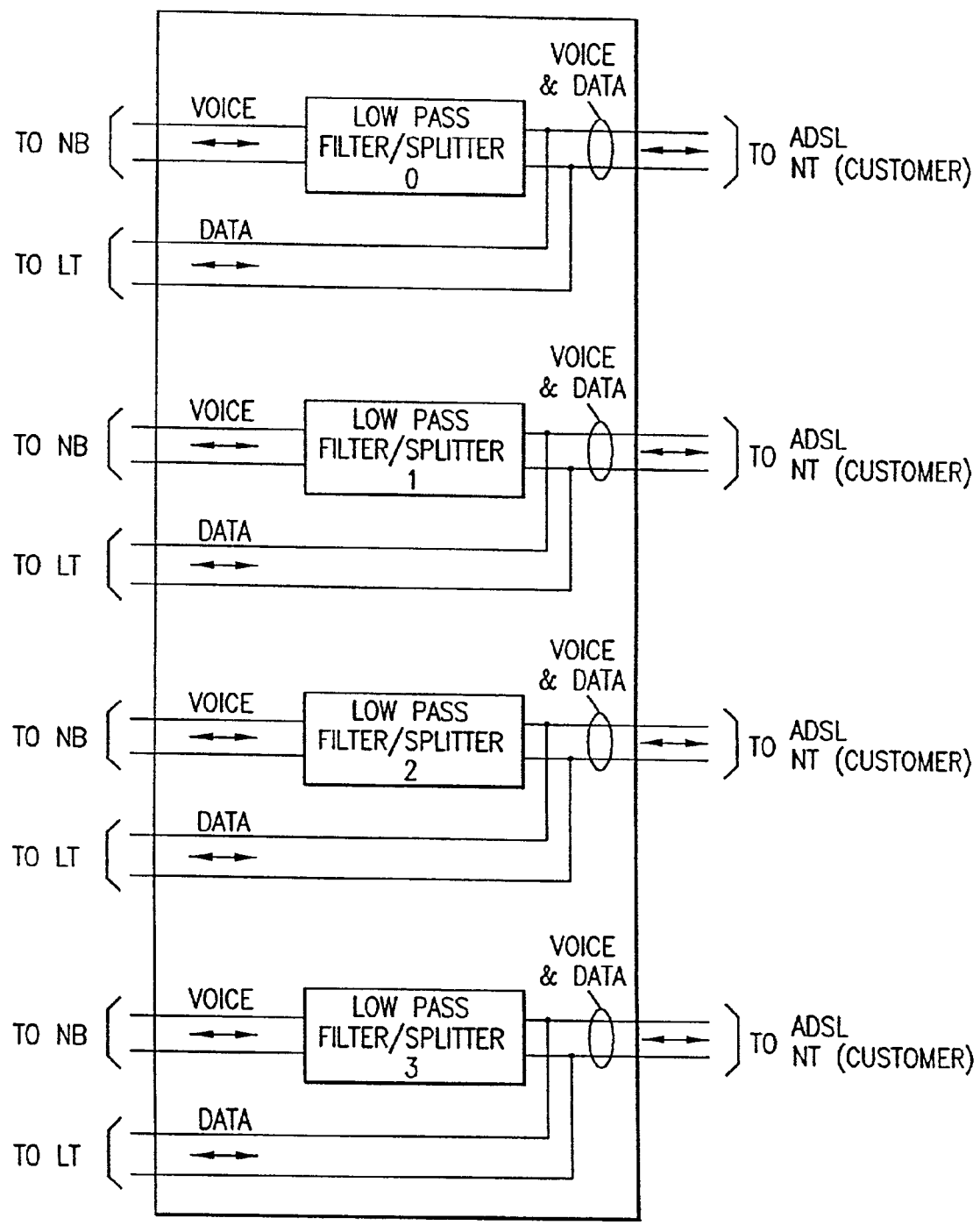
FIG. 7A shows a schematic block diagram of a lowpass filter card for insertion in one of the slots 24 in the upper section 22 of the shelf 10 of FIG. 1.
Figure 7C:
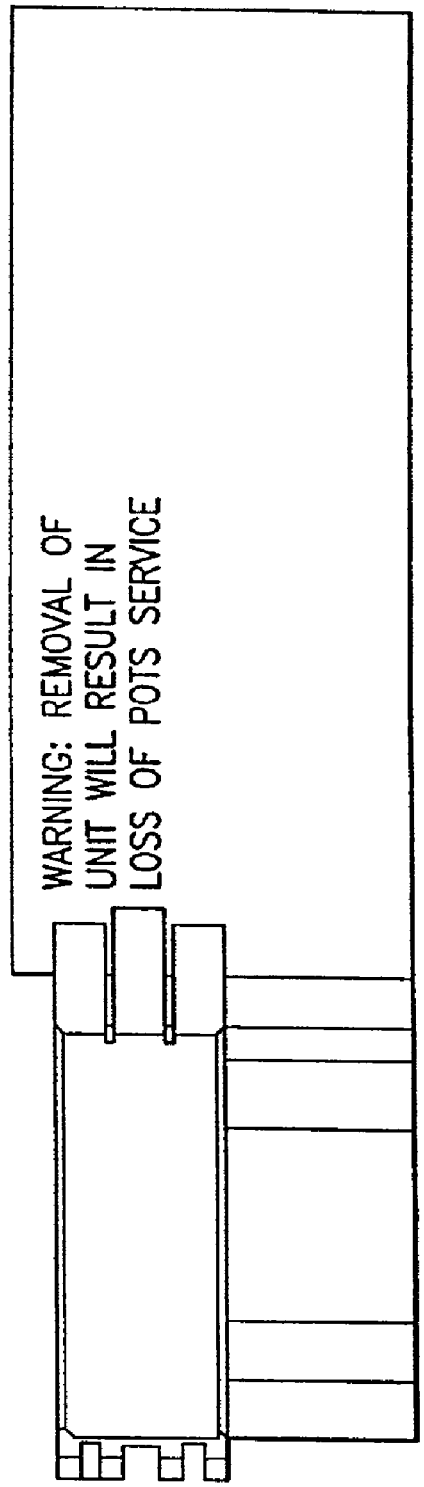
FIG. 7C shows a front view of the card of FIG. 7B, as seen from the front of the shelf of FIG. 1.

FIG. 7A shows a lowpass filter card, such as one of the LPF cards 24 shown in FIG. 1 in schematic block diagram form. Four different lowpass filters/splitters are shown on the card. To the left of each card is a voice port for connection to the narrowband (NB) network via the CO switch 46 via the line 50. On the righthand side of each lowpass filter/splitter is a port which is connected both to the twisted copper pair 36 to the subscriber and to the highpass filter 38 of the LT 62 (see FIG. 2). A side view of the physical dimensions of such a four-channel LPF card is shown in FIG. 7B, while a front view is shown in FIG. 7C.

FIG. 7D shows a splitter shelf for use in applications where the lowpass filters need to be remote from the ADSL shelf. Such a shelf can be used, for example, when (a) separate service providers are responsible for the telephony and ADSL services, or (b) in DLC (digital loop carrier) configurations where remote cabinets of DLC equipment cannot accommodate ADSL equipment (due to lack of physical space), but since the subscriber transmission pairs terminate in the DLC cabinet (and enough room is available for a small lowpass filter "splitter"), this shelf only is installed in the DLC cabinet.

Figures 8, 13D:
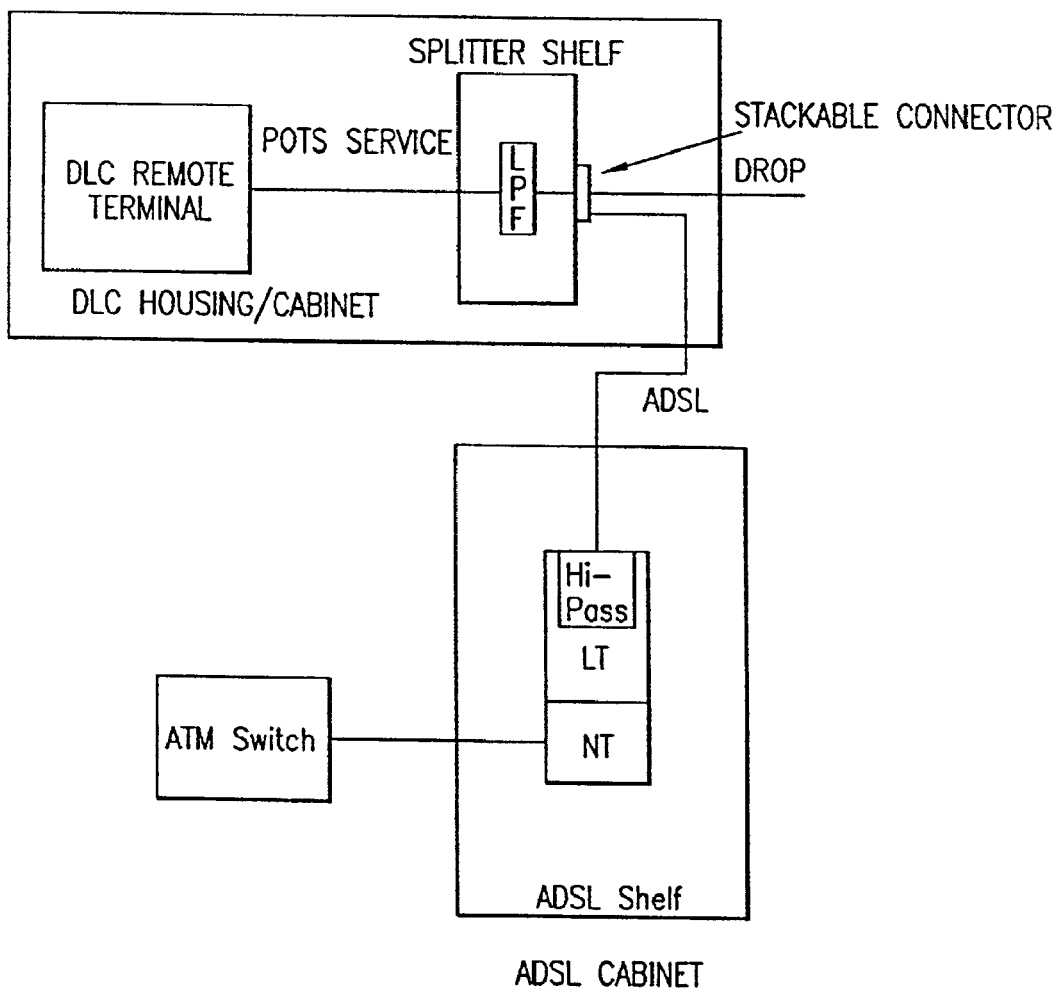
FIG. 8 shows a separate splitter shelf, such as that of FIG. 7D, used to add xDSL service to an existing DLC, according to the present invention.
FIG. 13D is a table showing the meanings of the various LED indicators of FIG. 13C.

In this case, the basic xDSL shelf is used, as previously shown, but with the LPF boards not populated. A separate "splitter" shelf, as shown in FIG. 7, is then provided and has a configuration the same as, or very much like, the top portion of the basic xDSL shelf 10 of FIG. 1. The main difference in remote splitter configurations is the cabling and the use of "stackable" connectors. The splitter shelf is shown in FIG. 7, and a typical configuration using splitter shelves is shown in FIG. 8. In an initial implementation, LPFs (and the splitter shelf) need no power, as all circuitry is passive.

Figure 8A:
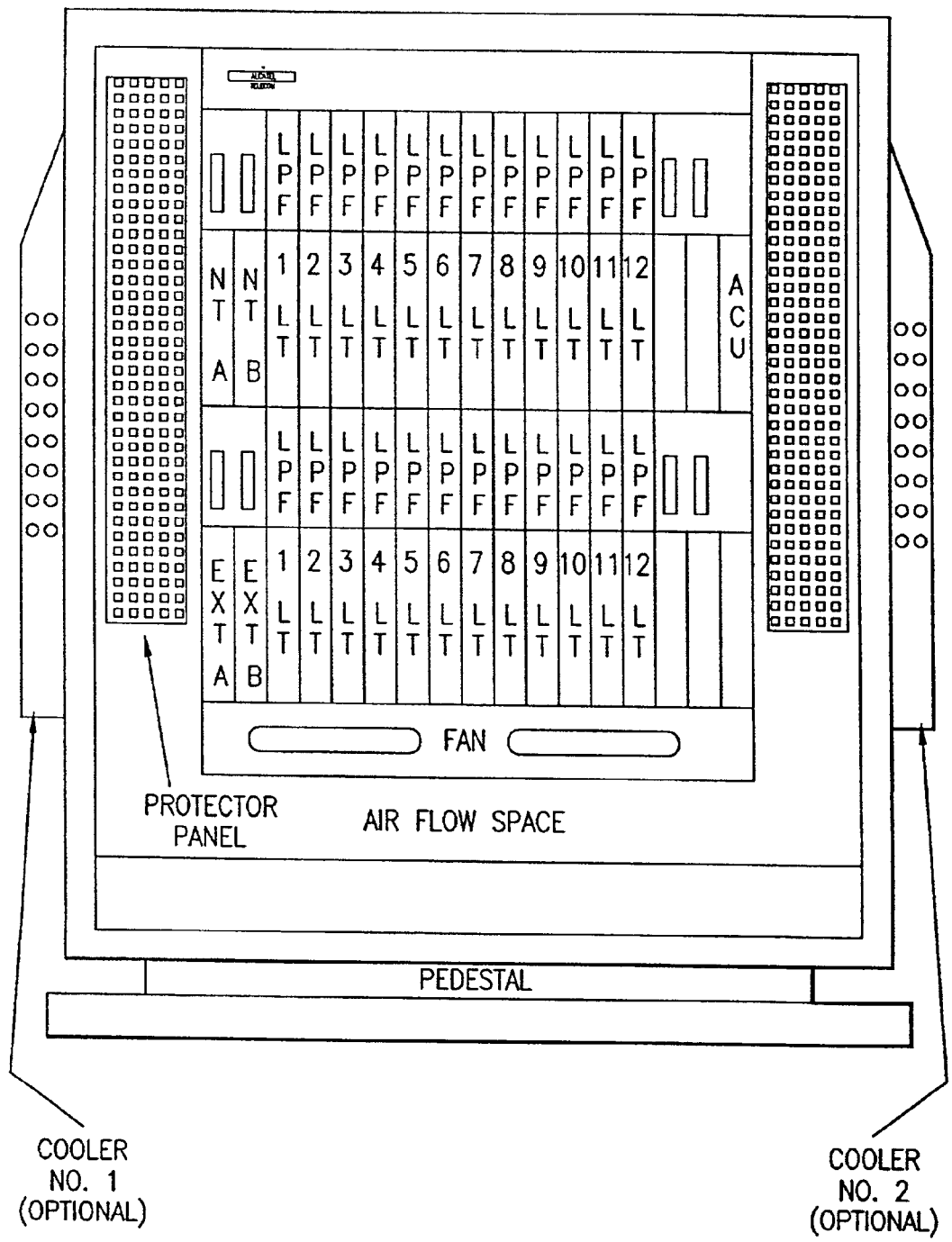
FIG. 8A shows an ADSL remote cabinet, such as shown in FIG. 8 in more detail, wherein the configuration shows supports up to 96 lines in a type 3002 cabinet.

FIG. 8A shows a remote cabinet that can be used when adding ADSL service to existing metallic-fed DLCs. This configuration supports up to 96 lines in a type 3002 cabinet.

It should be noted that the "separateness" of the lowpass filters 24 as shown in FIG. 1 from the LTs, as well as the separateness of the LPFs of FIGS. 7, 8 and 8A is not only advantageous for the reason mentioned above, i.e., for facilitating separate service providers for telephony and ADSL services, but also for the very important reason, according to the present invention, for physically separating the lifeline telephony service from the ADSL service. Such separateness provides an increased level of integrity for the lifeline POTS service, since such physical separateness itself ensures that any maintenance actions which may need to be performed on the ADSL part of the system can be done in a physically separate manner, and therefore in such a way as to not affect the POTS service (and vice versa).

Figure 9:
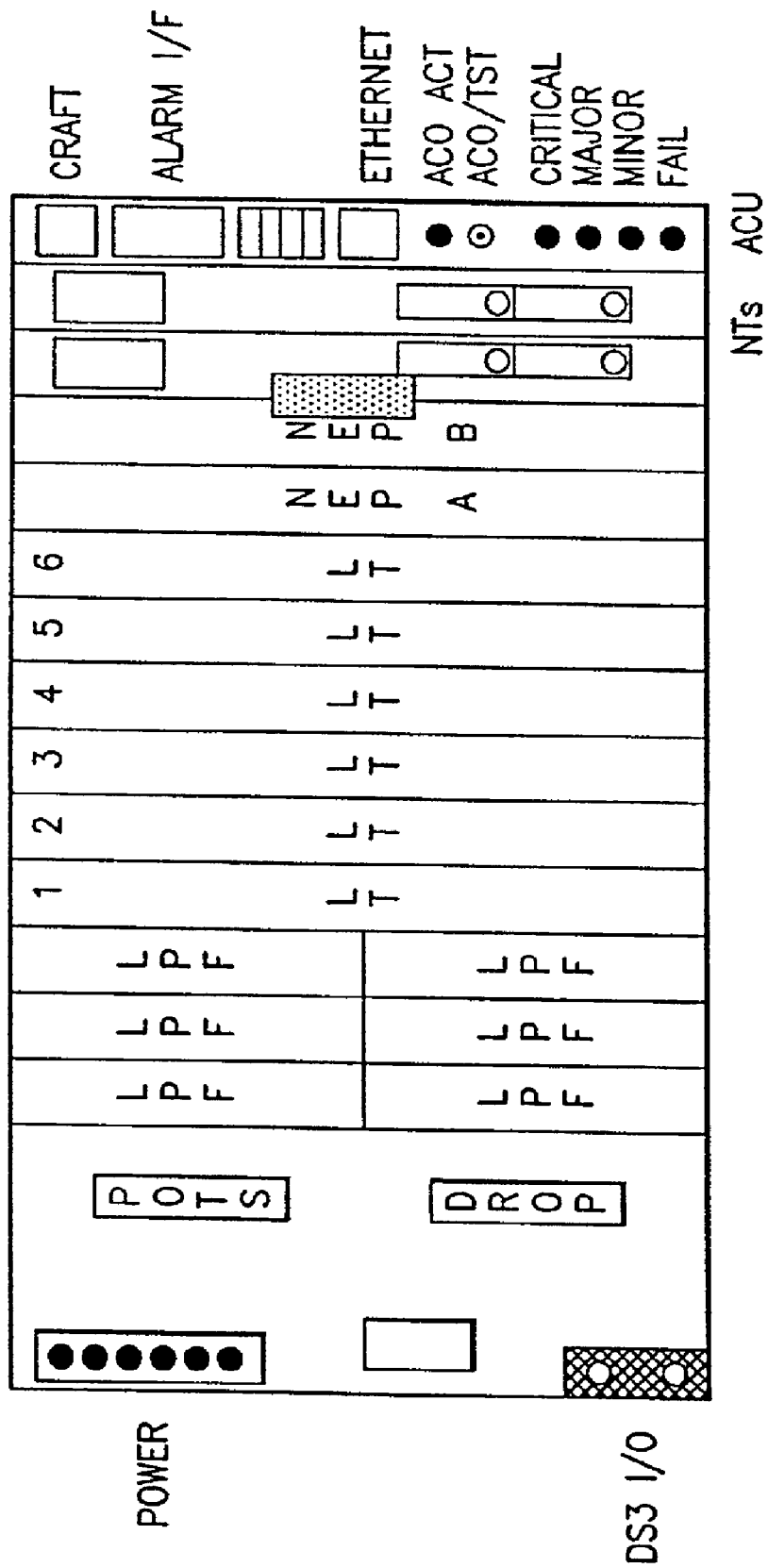
FIG. 9 shows a compact xDSL shelf, in this case, an ADSL RAM (remote access mux) shelf, according to the present invention.

Another equipment shelf is the RAM (Remote ADSL Mux) shelf as shown in FIG. 9. This shelf is deployed very much like the remote ADSL shelves 96, 98 shown in FIG. 4, and in fact may have the same shelf architecture as that shown in FIG. 3. The difference is that the RAM shelf is more suited for CPE or DLC applications where, e.g., no more than twenty-four lines are required, and a smaller shelf (6RS versus 9RS) is desired. As such, a RAM shelf may be designed and physically configured, for example, as shown in FIG. 9. This shows the flexibility of the xDSL shelf of the present architecture.

FIG. 10 shows a functional block diagram of one of the ADSL LT cards 14a of FIGS. 1, 3 and 4. The implementation of the various functional blocks is realized in this implementation by the application of an ADSL chip set of assignee for DMT technology. This chip set consists of three chips (integrated circuits) identified as RCHAP for ATM functions, a DACHA/SACHA chip for Reed Solomon coding and decoding, and a front-end DSP chip called ADSLB. The remaining blocks are preferably carried out by other means outside the chip set. The three chip chip set RCHAP, SACHA and ADSLB are also shown in FIG. 11 in a simplified block diagram that shows the chip set in both an LT 14a in an ADSL shelf 34 and in an ADSL modem 72 at a customer's premises in reverse ordering of chips.

In regard to the ATM functions carried out by the RCHAPB chip, such takes care of the encapsulation of ATM cells in 54-byte slots and the access to two separate IQ buses, i.e., upstream and downstream. There is also a dummy cell added to the 53 standard ATM cells in order to allow a change-over from one LT to another on the upstream IQ interface (between cells). On the downstream IQ interface, this byte is not filled in, and on the upstream IQ interface, the bus is in high impedance state during this byte.

The main entity which is conveyed through an ATM network is a cell which is divided into two parts, each with a fixed size: the header (5 bytes), and the information field (48 bytes). Depending on the value of the header of the ATM cell, a number of ATM-related functions may be performed, such as insertion and extraction of maintenance cells, cell rate decoupling, Header Error Control (HEC) generation/check, payload scrambling, cell loopback, etc.

The data that are sent on the ADSL line are forward error-corrected (FEC) by Reed Solomon (RS) coding to improve the bit error rate. To allow for an even better protection against burst errors an interleaving possibility is incorporated, with the disadvantage of an increased transfer delay for interleaved data. Also, a scrambler is included to randomize the data before the RS encoder. After the RS decoder, the data is then descrambled.

Also carried out by the SACHA chip set, besides Reed Solomon (de)coding is mapping and demapping. In the ADSL system, a DMT approach may be followed in which, for example, up to two hundred fifty-six carrier frequencies can be used (see FIG. 12). Each of these frequencies will carry a number of bits according to a mapping table. The function of the mapper is to assign the bits to the different frequencies. The mapper can also send some special DMT symbols for link initialization and maintenance. The demapper will demodulate and monitor the received symbols. After demodulation, it delivers the data to the on-chip RS decoder. Some special functions are included in the demapper for initialization and maintenance of the ADSL link. An example of an ADSL mapper is shown in FIG. 1 of copending and co-owned application Ser. No. 08/677,468, filed Jul. 10, 1996 and described at page 7, line 5, through page 9, line 23. A similar description is given in copending provisional application Ser. No. 60/052,124 filed Jul. 10, 1997, entitled "Method and Windowing Unit to Reduce Leakage, Fourier Transformer and DMT Modem Wherein the Unit is Used", at page 5, line 10, through page 7, line 26 thereof, now U.S. Pat. No. 6,240,129, issued May 29, 2001 based on regular U.S. patent application Ser. No. 09/113,719 and which in turn is based on European Patent Application 96201060, filed on Apr. 19, 1996, now EP Patent Publication No. 0802649.

The output of the mapper is a complex representation of all the carrier frequencies. An Inverse Fast Fourier Transformer is used to transform this representation to a time signal. In cooperation with the IFFT, a carrier selective scaling can be installed. In the upstream direction, an FFT is used to transform the received time signal to a frequency representation.

The main function of the front-end digital signal processing is to separate the received signal as much as possible from the transmitted signal, and to correct for the line and analog front-end characteristics.

The ADSLB chip function includes analog-to-digital (A/D) and digital-to-analog (D/A) conversion. The function of the subscriber line analog front end is the termination of the analog line interface and the transformation of the digital data into an analog passband signal that can be transmitted on a physical subscriber line 36 and vice versa. For the D/A and A/D conversion, a sigma-delta ($\Sigma\Delta$) approach is used.

As shown in FIG. 11, the subscriber line analog front-end function includes a line driver used to amplify the ADSLB output to the levels appropriate to be transmitted over the subscriber line. A hybrid is included as a passive network that performs the termination of the subscriber line with its nominal impedance and handles the conversion between four-wire and two-wire in the LT at the upstream end. It performs the separation in the upstream direction between the upstream and downstream signals, and the combining in the downstream direction. The reverse is performed at the downstream end of the line.

Figure 10B:
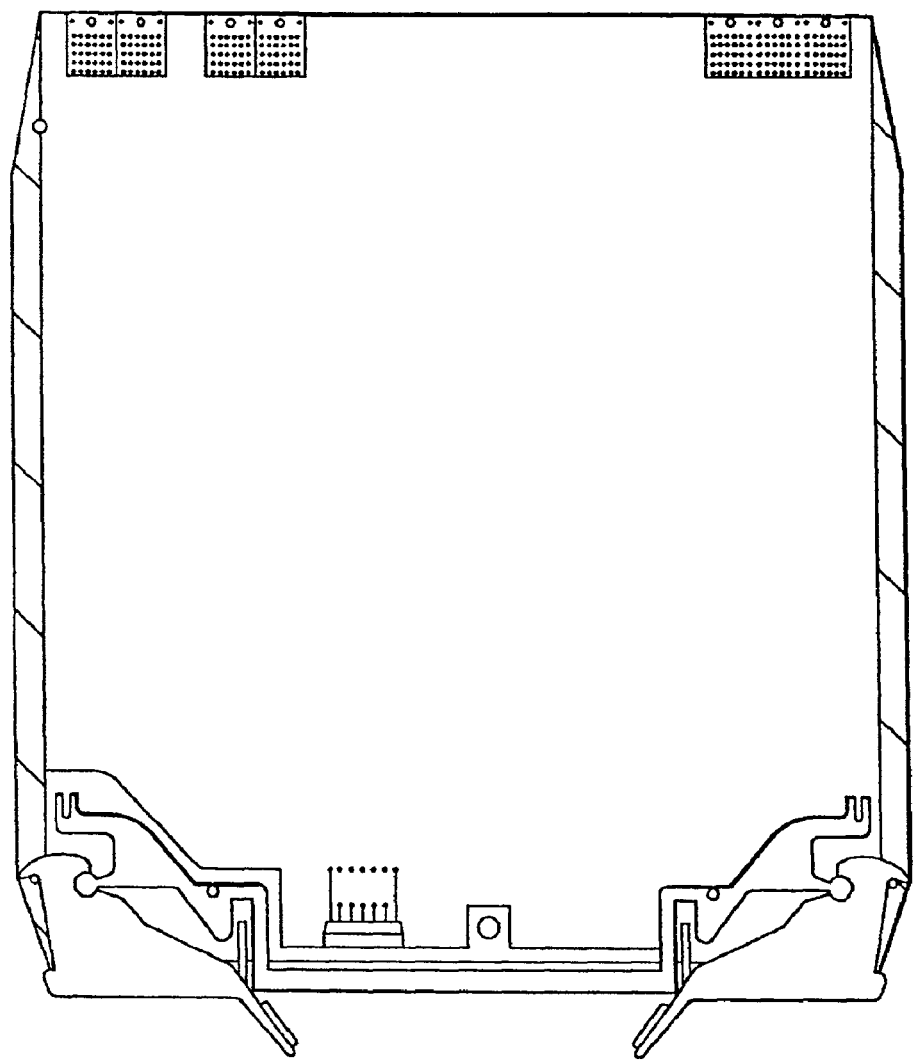
FIG. 10B shows a side view of an LT card.
Figure 10A:
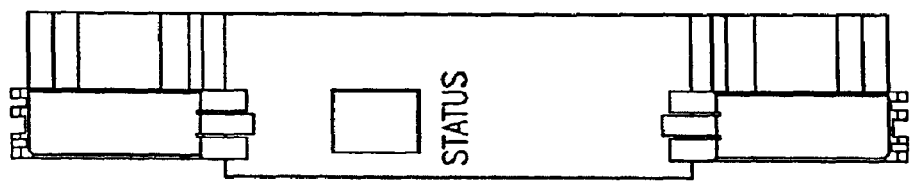
FIG. 10A shows a front view of an LT card.

Referring back to FIG. 10, it is noted that the LT 14a includes four separate line termination paths for four separate subscribers. Although not shown in FIG. 10 or 11, it should be realized that the twisted pair connects not only to the HP-filter and hybrid shown in FIGS. 10 and 11, but also to a lowpass filter 40, such as shown in FIG. 2. FIG. 10A shows a front view of an LT card, while FIG. 10B shows a side view.

Since POTS signals and ADSL signals are transported frequency-multiplexed on a subscriber line, as shown in FIG. 12, a POTS lowpass filter 26 is required, which performs the following functions: (1) combining the POTS and ADSL transmit signals toward the subscriber premises; (2) separating the POTS and ADSL signals from the subscriber premises; (3) protecting the POTS from audible interference, generated by signals from the ADSL modem and the ADSL shelf; and (4) protecting the ADSL receiver from all POTS-related signals, particularly dial pulses, ringing and ring trip transients.

These functions are performed while meeting all the requirements for POTS performance, such as return loss, insertion loss and group delay, such as those in ANSI Standard T1.413. The combination and separation of POTS and ADSL signals is achieved by lowpass and highpass filtering, as shown in FIG. 2. Only the highpass filter and the hybrid are part of the LT. As mentioned above, the lowpass part preferably resides on a different printed board assembly (LPF).

Also shown in FIG. 10 is an on-board controller (OBC), which may be embodied as a microprocessor included to handle a variety of tasks, such as initialization of ASICs, monitoring and processing of maintenance messages, and detection of a malfunctioning LT. On-board memory may include flash-PROM and DRAM used for executable code and data. Inventory information may also be stored on an EEPROM so as to provide the necessary data for an adequate identification of a replaceable item. Such may include product identification, manufacturing information and inventory information. Also shown in FIG. 10 are power supply functions by way of on-board mounted DC/DC converters. A test access port (not shown) may also be provided.

As will be understood by anyone of skill in the art, from American National Standard for Telecommunications "Network and Customer Installation Interfaces—Asymmetric Digital Subscriber Line (ADSL) Metallic Interface", ANSI T1.413-1995, the nature of the signal on the twisted pair 36 shown in FIG. 11 and in FIG. 2 may be a standardized asymmetric digital subscriber line signal that allows the provision of plain old telephone service (POTS) and a variety of digital channels. In the direction from the network to the customer premises, the digital channels may consist of full duplex low-speed channels and simplex high-speed channels; in the upstream direction, only low-speed channels are provided. The transmission system is designed to operate on two-wire twisted metallic cable pairs with mixed gauges. The standard is based on the use of cables without loading coils, but bridged taps are acceptable, with the exception of unusual situations. As shown in FIG. 12, for example, the power spectrum is shown as including a 4 KHz band reserved for POTS (narrowband) service, with the portion of the spectrum between about 40 KHz and 1.1 MHz occupied by a large plurality of carriers, with tone spacing of 4.3125 KHz for broadband/wideband services. A small portion of the spectrum is used for upstream data, as shown, with the remainder used for downstream data. Each of the 4 KHz tones is QAM-modulated and individually selected and optimized as a function of individual subscriber line characteristics. Some tones are allocated with a large number of bits, while others a lesser number or none at all, due to line conditions.

As shown in FIG. 11, the functions already described in connection with an ADSL LT 14a are replicated in the ADSL modem 72. In addition, a selected interface to the subscriber PC 76 may include, e.g., an ATM-25 and/or Ethernet interface, as shown in FIG. 11.

Figure 13A:
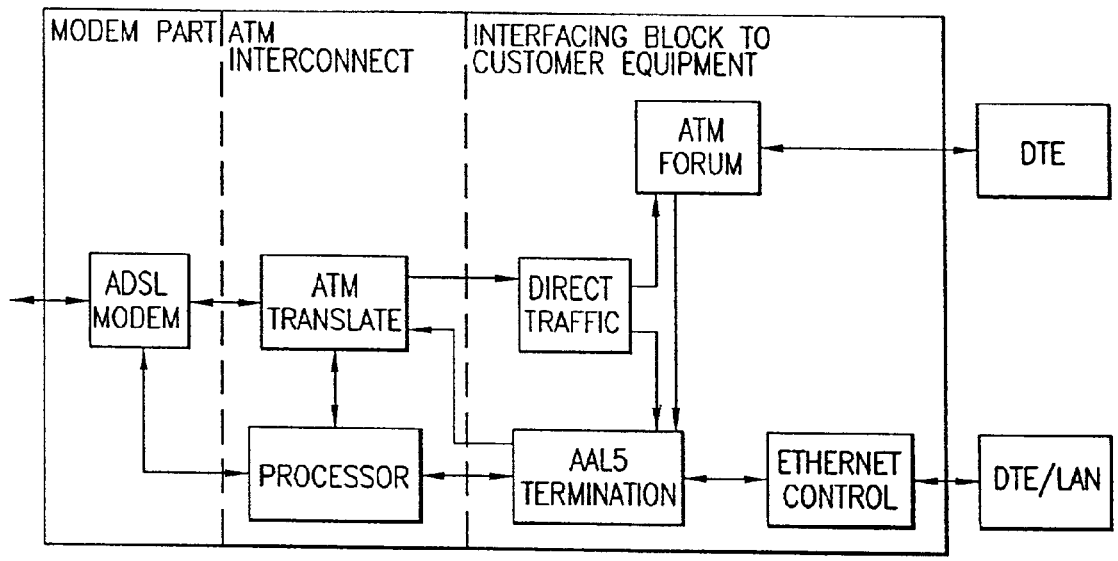
FIG. 13A shows a simplified block diagram of an ADSL modem for use in a subscriber's premises, according to the present invention.
Figure 13B:
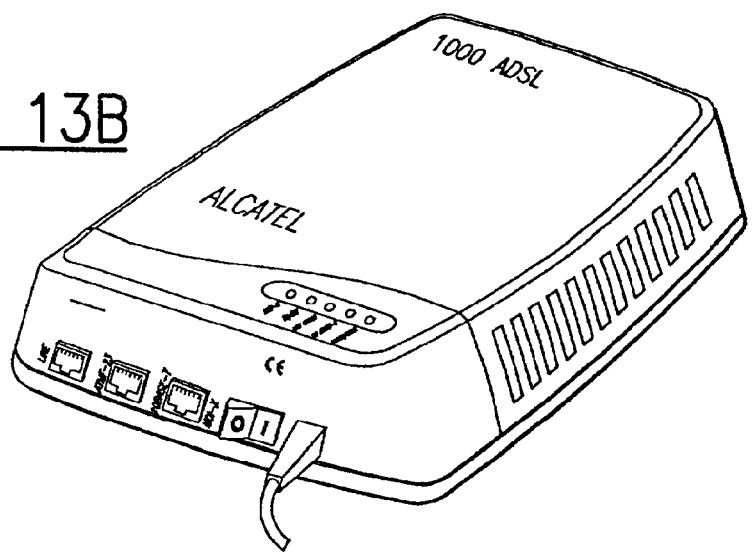
FIG. 13B shows the exterior of a physical embodiment of an ADSL modem such as shown in FIG. 13A.
Figure 13C:
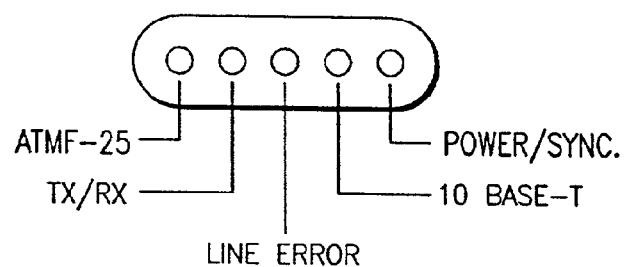
FIG. 13C shows an LED layout for the modem of FIG. 13B.
Figure 13E:
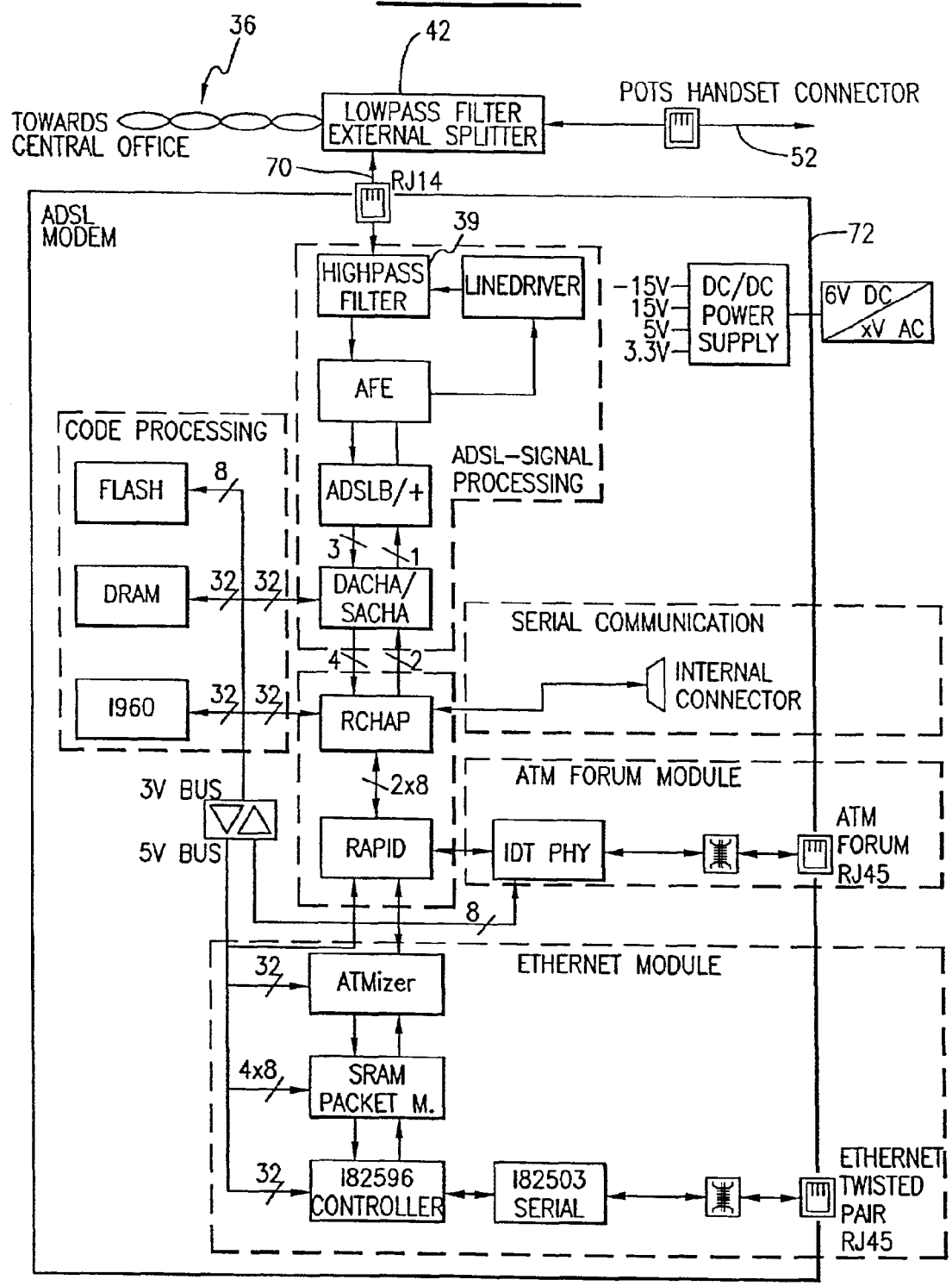
FIG. 13E shows a more detailed functional block diagram of an ADSL modem for use in a subscriber's premises, according to the present invention.

FIG. 13A shows a simplified block diagram illustration of an ADSL Network Termination (ANT) unit. It includes a modem part which performs the ATU-R transmitter reference model functions, for example, as shown in Section 4.3 of ANSI T1.413-1995. An ATM function is added, according to the present invention, for ATM translation and signal processing. In the downstream direction, the ANT unit terminates the ADSL signal, demodulates, and the interconnect function converts the ATM cells into a digital bitstream to the subscriber's digital terminal equipment (DTE). In the embodiment shown, the interfacing block to the customer equipment includes both ATM and/or ethernet interfaces, as shown. FIG. 13B shows an ADSL Network Termination Unit with the line, ATM and ethernet connections shown. The line connector is RJ14, while the ATMF-25 and 10Base-T connectors are RJ45. FIG. 13C shows five LED indicators that are visible on the top of the box of FIG. 13B for giving the indications indicated in the table of FIG. 13D.

A more detailed functional block diagram of an ADSL modem 72 (such as already shown in FIG. 11) is shown in FIG. 13. The lowpass filter 42 of FIG. 2 is shown as part of an external "splitter" in FIG. 13, which also includes the node 68 of FIG. 2.

An external AC/DC inverter (6V DC/xV AC) and an on-board DC/DC power supply are shown in FIG. 13 and are used to feed the power to the board. The external power supply (AC/DC) converts the high voltage from the wall outlet to a voltage that can be handled by the ADSL modem 72, such as +6 volts DC. Further conversions are shown from the DC/DC power supply.

An analog front-end may include the highpass filter 39 already shown in FIG. 2, as well as a hybrid and line driver such as shown in FIG. 11. The hybrid is for 2-wire to/from 4-wire conversion.

An ADSLB block is shown for terminating the analog line interface and for transformation of digital data from a DACHA/SACHA block into an analog passband signal that can be transmitted on a physical subscriber line and vice versa. The ADSLB performs analog-to-digital (A/D) and digital-to-analog (D/A) conversion.

Again, the SACHA is the DMT signal modulator/demodulator. This software-configured ASIC processes the ATM cells (scrambled) from the RCHAP block and delivers the DMT modulated signal to the ADSLB and vice versa. Note that there is no difference between the DACHA and the SACHA, except a lower cost for the SACHA. A DACHA can be used as well, and is especially necessary to support a standardized 4.3125 KHz tone spacing mode.

The RCHAP provides the interconnection between the SACHA/DACHA and the rest of the system. It contains 16 ATM cell buffers in both upstream and downstream directions, and performs virtual path/virtual channel (VP/VC) translation, extraction and insertion of ATM cells, and handles on-board tasks.

A RAPID block provides interfacing between RCHAP, ATM-izer and IDT-PHY blocks. It also contains DMA controller and logic for ethernet functions.

The IDT-PHY block translates ATM cells between the on-board parallel data bus (with standard byte-wide cells) and the serial data over the ATM Forum physical connector (with scrambled 4B5B coded data).

The ATM-izer is the upstream controller, responsible for upstream quality of service, cell shaping and policing. It is responsible for translating downstream AAL5 packets into ethernet-frames and vice versa. Handling upstream ATM Forum data is also performed by the ATM-izer.

An I82596 controller performs CSMA/CD medium-access control, moves ethernet frames between SRAM packet memory and a serial ethernet transceiver. It is monitored by the OBC. An I82503 performs a serial transceiver function to 802.3 10Base-T, direct interface to I82596.

For code processing, an I960 microprocessor is included to handle a variety of tasks, such as initialization of ASICs, memories, etc., monitoring and processing of the maintenance messages, on-line/off-line test support. Memory is included in the OBC as well, such as 2 Mb DRAM for program executables and a 1.5 Mb F-PROM for boot code, power-on test, a 512 Kb for ethernet packet memory, etc. A small EEPROM (4 Kbit) is used for a remote inventor circuit.

FIG. 14A shows a simplified block diagram of an embodiment of an NT card, according to the present invention. It provides a high-speed optical or electrical access to a Synchronous Optical Network (SONET) transport system. It converts Asynchronous Transfer Mode (ATM) cells to SONET packets (i.e., frames) and vice versa. Thus, the NT card adapts ATM cells carried on the IQ bus to the SONET transmission system and vice versa. It also includes necessary functions as listed in the table of FIG. 14B for operating and maintaining the ATM subscriber access multiplexer of the present invention.

It is noted that the table of FIG. 14B is split into two columns representing downstream functions and upstream functions. The downstream functions, for example, have been grouped and numbered 1–4, and similarly labeled in FIG. 14A in the top section of the respective four blocks. Similarly, for the upstream functions, these have been grouped in the right-hand side of the table and have been numbered 5–8, with the same numbers shown in the lower half of the blocks of FIG. 14A. It should be realized that these functions can be moved between blocks, and this is just an example.

In regard to the physical medium block, this can be an optical interface for interfacing an optical transport system with a receive and transmit optical fiber carrying signals, e.g., with a nominal bit rate of 155.52 Mbps. The interface is symmetric, i.e., it has the same bit rate in both directions and could operate, e.g., at a wavelength of 1.3 μm. This signal can be a SONET (Synchronous Optical Network) signal at the OC-3 level for conversion to STM-1/STS-3c in the electrical domain. This is a serial signal which the physical medium interface block converts to parallel form at a slower rate for processing on the NT card, with the parallel downstream output locked on to the received clock.

Figure 14D:
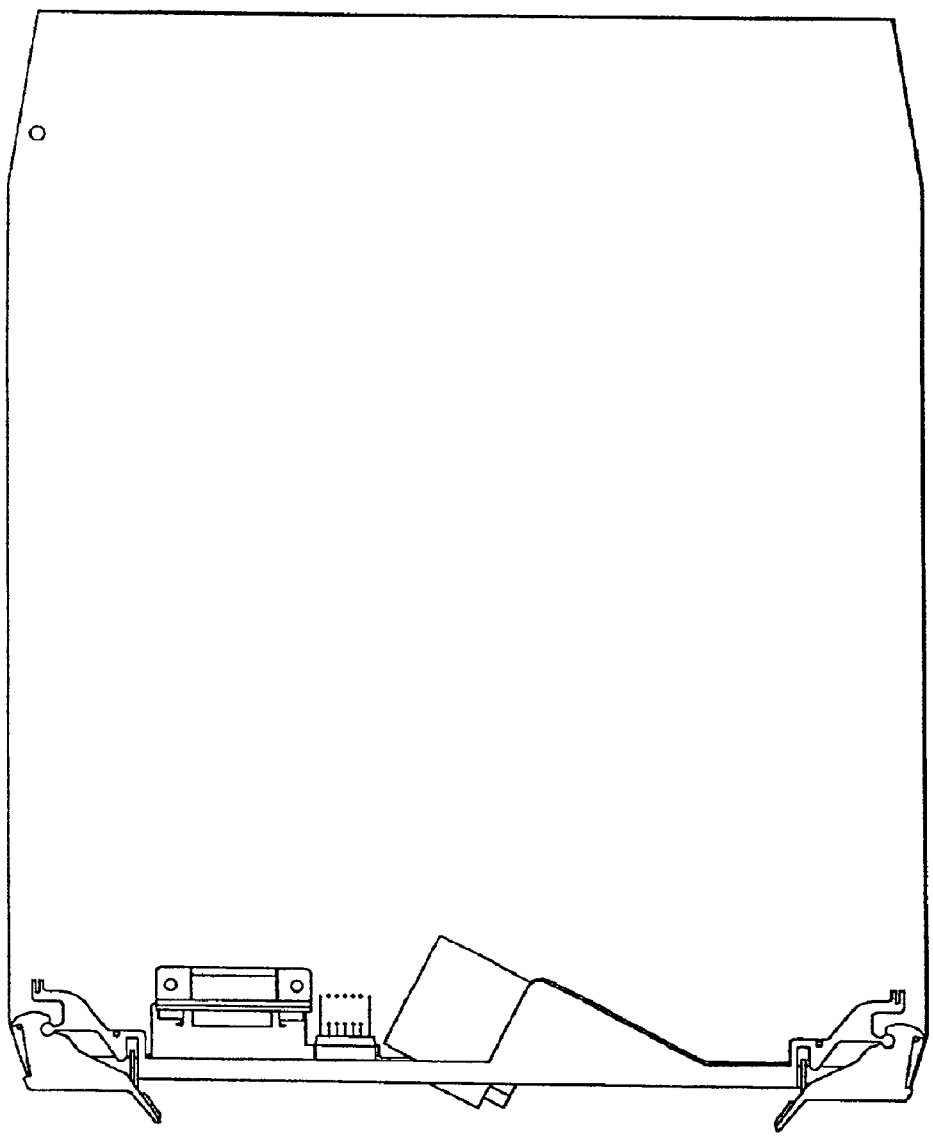
FIG. 14D shows a side view of an NT card, according to the present invention.
Figure 14C:
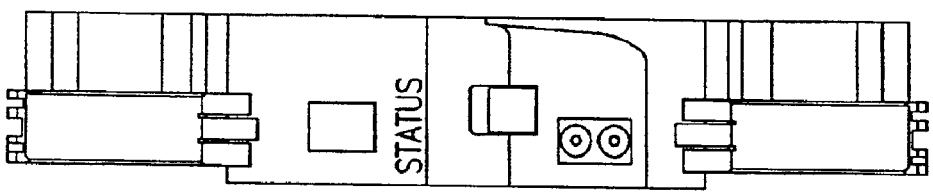
FIG. 14C shows a front view of an NT card, according to the present invention.
Figures 14F, 14G, 14H:
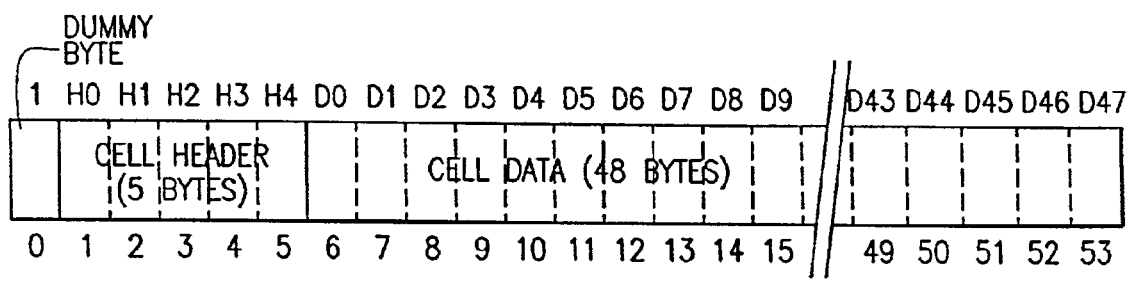
FIG. 14F shows a cell header structure for an ATM cell which is the main entity which is conveyed through an ATM network.
FIG. 14G is a table showing the routing of received ATM cells depending upon certain bits in the cell header, combinations of which can be checked according to the modes shown in the table.
FIG. 14H shows an IQ bus cell layout, according to the present invention.

The transmission convergence sublayer processing is done in the second block, wherein the ATM cells are delineated within a hierarchical transmission frame structure used to transport the ATM cells. These cells are divided into two parts, each with a fixed size, the head with five octets, as shown in FIG. 14F, and the payload with 48 octets, as shown in FIG. 14H. In the ATM block of FIG. 14A, ATM layer processing is carried out. In the upstream direction, all fields in the ATM cells received on the IQup interface are transported transparently, except for the Header Error Control (HEC) field (see ITU-T Recommendation I.361, "B-ISDN ATM Layer Specification"). The HEC may be checked or not, as an option. The routing of received ATM cells depends upon the VPI (Virtual Path Identifier) and VCI (Virtual Channel Identifier) bits in the cell header. The full VPI octet and the eight least significant bits of the VCI can be checked for VPI/VCI combinations corresponding with a data channel to be extracted. This method provides for a maximum of $2^{16}$ channels which can be marked for extraction. All valid cells received from the IQ interface are transmitted either upstream in a virtual container or synchronous payload envelope (VC-4/SPE, or to an on-board controller.

For downstream ATM layer processing in the ATM block of FIG. 14A, each VC-4/SPE carries the equivalent of 44.151 cells (53 octets) which are octet-aligned and floating within the VC-4/SPE. The ATM cell delineation uses the correlation between the Header Error Control (HEC) in the cell header and the cell header itself. The cell delineation mechanism, as recommended by ITU-T Recommendation I.432, "B-ISDN User-Network Interface-Physical Layer Specification", is used. When the ATM cell boundary identification in octet H4 is used, the cell delineation will start searching at the octet indicated by H4. If not, the search will start at the first octet of the payload period. The ATM cell information fields are descrambled according to the self-synchronizing scrambling/descrambling scheme recommended by ITU-T.

Valid non-idle cells, each with its confirmed HEC octet and descrambled information field, are sent to the IQ down interface, which is the last block shown in FIG. 14A. In that block, idle cell periods are added to adapt a received bit rate of up to 149.76 Mbit/s to 152.64 Mbit/s.

The routing of received ATM cells depends upon the VPI, VCI and PTI (payload type identifier) bits in the cell header. In total, 16 bits or four nibbles of VPI/VCI combinations can be checked, according to the modes shown in FIG. 14G. In each mentioned mode, different nibbles of VPI/VCI are selected. The selected VPI/VCI nibble combination corresponds with a specific data channel to be extracted. Cells can be extracted by looking only at the VPI/VCI combination or by looking at the VPI/VCI combination and at the PTI bits. In the second case, each PTI ($2^3$ in total) can be marked for extraction. This marking will then be used for all VPI/VCI combinations for which extraction is indicated, with the inclusion of the PTI check. All valid cells received in the virtual container or synchronous payload envelope, independent of their VPI/VCI combination, are transmitted downstream on the IQ down interface (cells marked for extraction are also sent to the ATM interface bus).

ATM cell insertion and extraction is provided at the NT both in the direction of the network and in the direction of the IQ bus, in order to provide for the transmission and reception of Operation And Maintenance and signaling cells. Cell insertion and extraction is under control of an On-Board Controller (OBC).

In the upstream direction, the OBC has the possibility of inserting ATM cells in the outgoing VC-4/SPE. The OBC has to provide a valid cell header without HEC, followed by a least six bytes and, at most, the complete cell payload (a total of 52 octets). The HEC is calculated before the cell is put into the VC-4/SPE. Interfacing between the OBC and upstream cell stream is performed by using a FIFO buffer on which a back pressure signal indicates if the OBC is allowed to insert a cell or has to wait until the previously inserted cell is transmitted. Cells received on the IQ up interface have a higher priority than cells coming from the OBC. Synchronization is performed by a synchronization signal which indicates to the cell insertion device where the boundary between two inserted cells in the FIFO buffer is. Downstream, the OBC has the possibility of inserting ATM cells in the IQ down cell stream. The OBC has to provide a valid cell header without HEC, followed by at least six bytes and at most the complete cell payload (a total of 52 octets). The HEC is generated when transmitted onto the IQ interface. Interfacing between the OBC and the downstream cell stream is performed by the same cell FIFO buffer as for the upstream cell insertion. Also for downstream cell insertion, a back pressure mechanism is implemented. Cells received in the VC-4/SPE have a higher priority than cells from the OBC. Synchronization is performed by a synchronization signal, which indicates to the cell insertion device where the boundary between two inserted cells in the FIFO buffer is.

For cell extraction in the upstream direction, such is performed using the cell filtering mechanism described above. Only the first four octets of the cell header and the complete payload are extracted from the IQ up interface. For interfacing between the extraction circuitry and the OBC, a FIFO buffer is used. The OBC should synchronize to the extracted cell stream by reading blocks of 52 octets until the buffer is empty.

Downstream cell extraction is performed using the cell filtering mechanism mentioned above. Only the first four octets of the cell header and the complete payload are extracted from the VC-4/SPE. Before a possible extraction, the HEC in these cells is already checked for errors. For interfacing between the extraction circuitry and the OBC, a FIFO buffer is used. The OBC should synchronized to the extracted cell stream by reading blocks of 52 octets until the buffer is empty. The cell which is extracted towards the OBC can optionally be sent to the IQ down interface also.

As suggested above, the IQ down and IQ up buses transport ATM cells with a five-octet header and a 48-octet information field. In front of each cell is one dummy octet, illustrated in FIG. 14H. The ATM cells are encapsulated in 54 octet slots and provided access to the IQ bus. The adaptation of 155.52 Mbit/s to 152.64 Mbit/s (53/54*155.52 Mbit/s) is performed by the deletion of idle cells. This can be done due to the fact that the maximum bit rate of valid ATM cells contained in the VC-4s/SPEs is limited to 149.76 Mbit/s (26–27*155.52 Mbit/s).

The dummy octet is added to the ATM cells in order to allow a changeover from one LT to another on the IQ up interface (between cells). On the IQ down interface, this octet is not filled in, on the IQ up interface, the bus is in high impedance state during this octet.

The NT card is managed by an ADSL workstation (AWS) which may be located in an operating system (OS) as shown in FIG. 5. Such an OS may communicate through an ATM network and an ATM switch in a central office with the NT card in the shelf. See co-owned U.S. patent application Ser. No. 08/891,259, filed Jul. 10, 1997, now U.S. Pat. No. 5,991,814 entitled "ASAM Network Management System with Open Loop Flow Control", for further details, and which is hereby incorporated by reference. FIG. 14C shows a front view and FIG. 14D a side view of an NT card, such as may be used in a slot of a shelf of FIG. 1.

FIG. 14E shows a more detailed functional block diagram of an NT card 12a of FIG. 1. An optical/electrical transceiver provides a SONET/SDH compliant interface for 155.52 Mbps STM1 or STS3-c signals in one integrated package. Clock recovery is done in the S/UNI+. In order to do this clock recovery, it requires a reference clock. The recovered clock (155.52 MHz) is divided by eight in the S/UNI+ and serves as one of the inputs for serving as a reference clock to a PLL circuit located in a UIAC block to which a VCXO output clock must track (if loop timing is enabled). The resulting clock out of the VCXO serves as input clock for transmit data towards the optical transceiver, where this clock is used to synthesize the transmit clock, and which also serves as a system clock. The reference clock input and the VCXO output clock are further divided by a factor N in the UIAC (N=2048 for Bellcore and N=128 for ITU). After a phase comparison between the two resulting divided clocks, the resulting voltage is fed to a lowpass filter, after which the signal drives the VCXO. Loop timing can be established by locking the transmit clock (system clock) on the receive clock.

At the ATM side of the S/UNI+ there are two internal four-cell synchronous FIFO's present that are controlled by the UIAC. This interface acts as an SCI/PHY (Utopia-like) interface. Back pressure (upstream) is inherently present due to the FIFO's integrated in the S/UNI. For the upstream direction, this means that if there is a full load of 155.52 Mbps on the IQ bus (152.64 Mbps at the Utopia interface) and a maximum transmit capacity of 149.76 Mbps ATM cells, the four-cell FIFO will be full after 1.5 ms.

The UIAC component is an LCA device which is programmed during "power-on-reset" from a serial PROM. It uses three synchronous 512×9 bit FIFOs for cell insertion and extraction and one 128K×8 bit SRAM for routing. The UIAC module has a SCI/PHY (Utopia-like) interface to the S/UNI+ component. ATM cell insertion in both the direction of the network (SDH/SONET) and in the direction of the LTs is handled by a 1 SIF (signaling insertion FIFO) buffer. An OBC bus is connected directly to the eight data inputs of the FIFO. The direction of cell insertion is specified by the OBC by writing into an additional UIAC register. The ninth bit of the FIFO is used for cell synchronization and insertion direction specification. A RAM lookup table is used for cell filtering on VPI/VCI combinations. The RAM has 128K entries of eight bits.

Downstream cell extraction is performed by a downstream signaling extraction FIFO (DSEF). The eight-bit output data of this buffer is connected to a peripheral bus. All cells which are extracted are copied by default to the downstream traffic stream. This can be disabled, however, by a traffic control register in the UIAC.

Upstream cell extraction is performed via the USEF (upstream signal extraction FIFO). The eight-bit output data of this buffer is connected to the peripheral bus. A cell received on the upstream IQ interface is sent either to the OBC or to the upstream SDH/SONET interface. All cells which are extracted are copied by default to the upstream traffic stream. This can be disabled, however, by the traffic control register in the UIAC.

In the downstream direction, ATM cells are transferred to an ICOM interface. In the upstream direction, ATM cells are received from the ICOM.

The UIAC may be equipped by a boundary scan interface conforming to IEEE 1149.1 (JTAG) Specification.

Figure 15A:
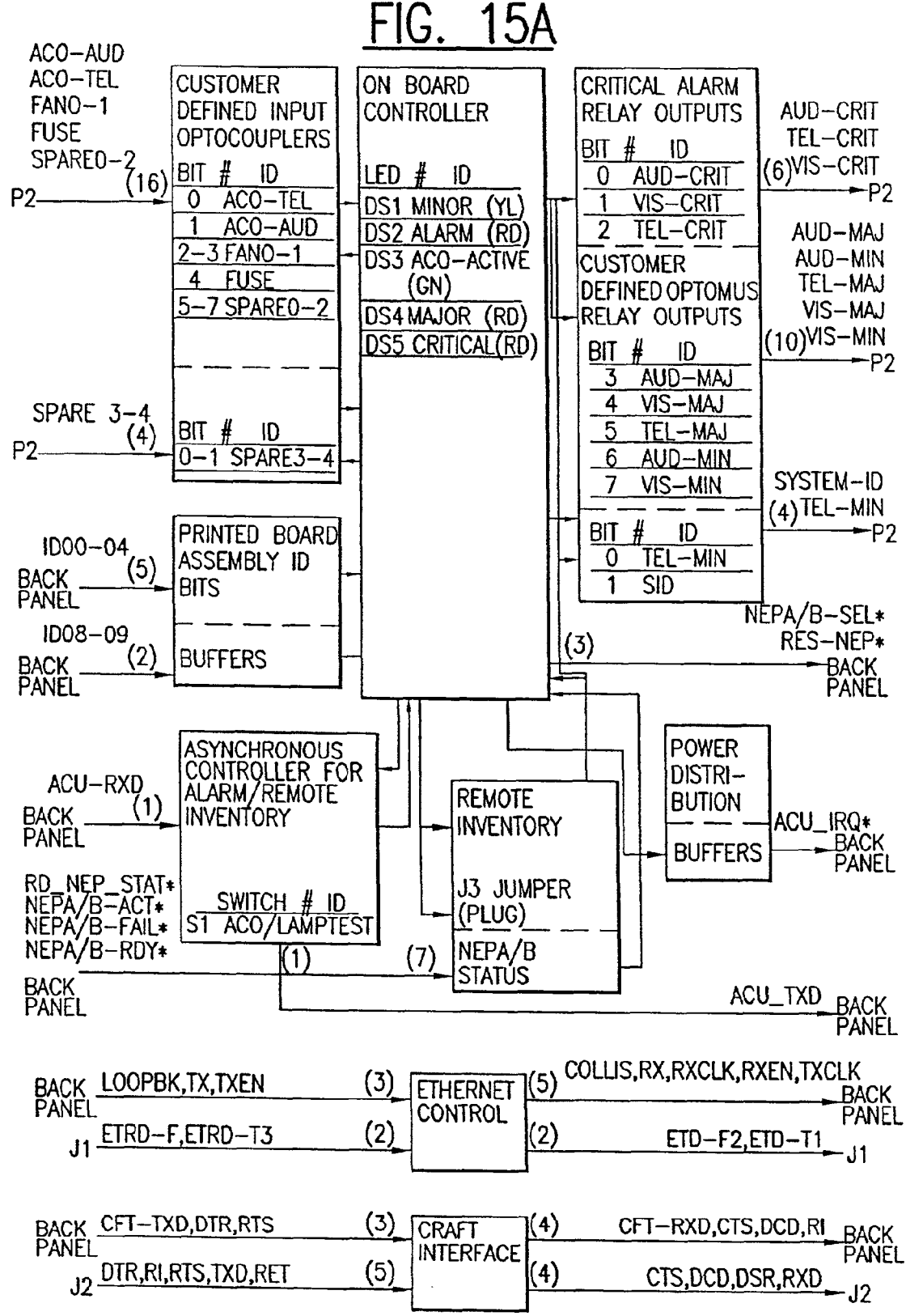
FIG. 15A is a block diagram of an ADSL Alarm Control Unit (ACU).
Figure 17:
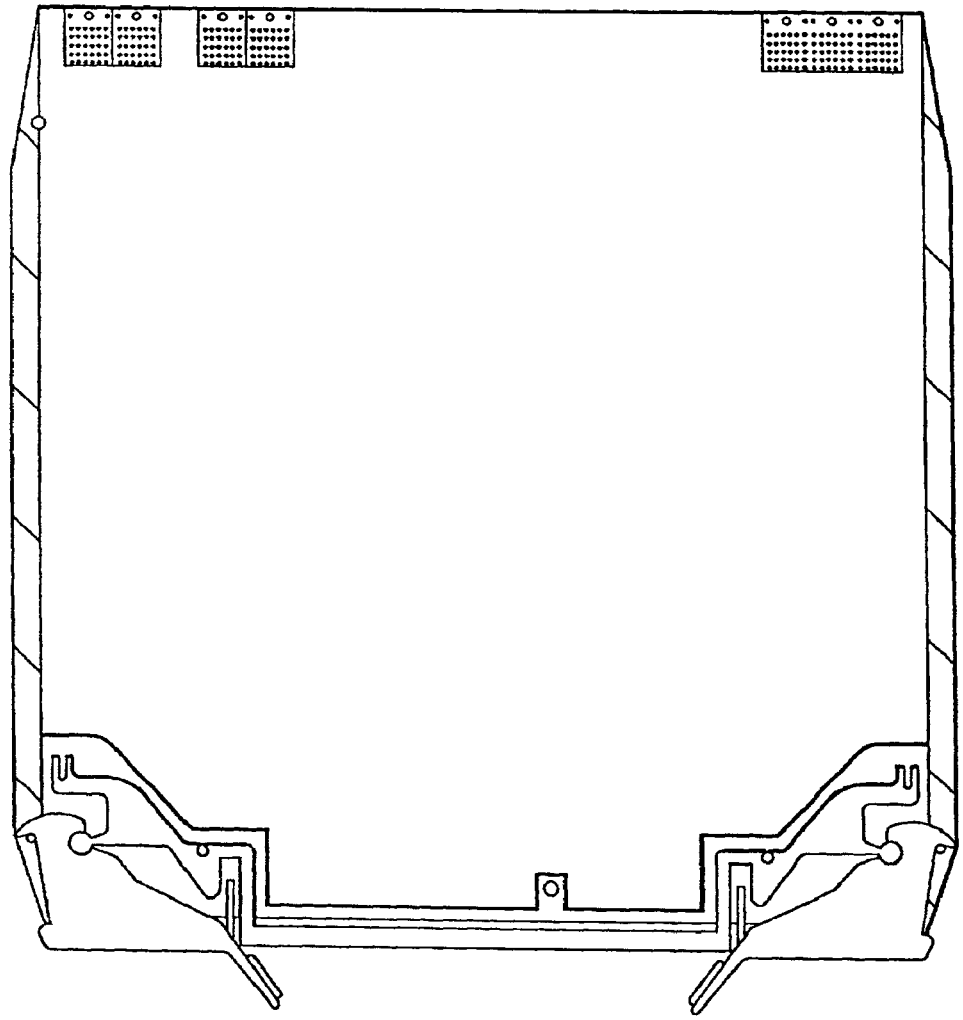
FIG. 17 is a side view of the ACU card of FIG. 16.
Figure 16:
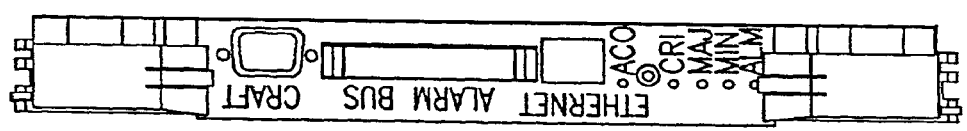
FIG. 16 shows an actual physical embodiment of an ACU card for insertion in the rightmost slot of the shelf of FIG. 1.

A block diagram of an ADSL Alarm Control Unit (ACU) is shown in FIG. 15A, while the functions thereof are listed the table of FIG. 15B. FIG. 16 shows a front view and FIG. 17 a side view of the ACU.

In addition to the foregoing disclosure, the following disclosures are hereby incorporated by reference:

U.S. Pat. No. 5,636,253, issued Jun. 3, 1997, entitled "Method for Detecting Erasures in Received Digital Data";

U.S. Pat. No. 5,633,817, issued May 27, 1997, entitled "Fast Fourier Transform Dedicated Processor";

U.S. patent application Ser. No. 08/561,445, filed Nov. 21, 1995, entitled "Signal Processor Module", disclosing ADSL selective DPLL, now U.S. Pat. No. 5,657,355, issued Aug. 12, 1997;

U.S. patent application Ser. No. 08/560,938, filed Nov. 20, 1995, entitled "Signal Processor", disclosing a DMT-based transceiver, now U.S. Pat. No. 5,768,318, issued Jun. 16, 1998;

U.S. patent application Ser. No. 08/593,885, filed Jan. 30, 1996, entitled "Frequency Division Multiple Access (FDMA) Dedicated Transmission System, Transmitter and Receiver Used in Such a System", disclosing a DMT modem for multiple access, now U.S. Pat. No. 5,809,030, issued Sep. 15, 1998;

U.S. patent application Ser. No. 08/677,468, filed Jul. 10, 1996, entitled "Method for Allocating Data Elements in Multicarrier Applications and Equipment to Perform This Method", disclosing ADSL bit allocation, now U.S. Pat. No. 5,812,599, issued Sep. 22, 1998;

U.S. patent application Ser. No. 08/675,323, filed Jul. 10, 1996, entitled "Method of Allocation Data Elements to a Set of Carriers, Mapping Unit and Modulator to Perform this Method", disclosing an ADSL BIGI Algorithm, now U.S. Pat. No. 5,790,550, issued Aug. 4, 1998;

U.S. patent application Ser. No. 08/700,756, filed Aug. 15, 1996, entitled "Method for Interleaving Data Frames, Forward Error Correcting Device and Modulator Including Such a Device", disclosing interleaving in ADSL, now U.S. Pat. No. 5,907,560, issued May 25, 1999;

U.S. patent application Ser. No. 08/718,641, filed Sep. 17, 1996, entitled "Sensing Circuit", disclosing an activity detector for ADSL, where the CO is quietly awaiting for remote activity, now U.S. Pat. No. 5,963,885, issued Oct. 5, 1999;

U.S. patent application Ser. No. 08/729,429, filed Oct. 11, 1996, entitled "Method for Transmission Line Impulse Response Equalization and a Device to Perform this Method", disclosing an ISI reduction algorithm in an analog (front-end) transceiver, now U.S. Pat. No. 5,870,432, issued Feb. 9, 1999;

U.S. patent application Ser. No. 08/783,859, filed Jan. 16, 1997, entitled "Method and Modem for Adaptive Allocation of the Pilot Carrier in a Multi-Carrier System", disclosing DMT pilot tone reallocation, now U.S. Pat. No. 5,867,528, issued Feb. 2, 1999;

U.S. Provisional Application Ser. No. 60/052,124 filed Jul. 10, 1997, now allowed U.S. patent application Ser. No. 09/113,719, filed Jul. 10, 1998, entitled "Method and Windowing Unit to Reduce Leakage, Fourier Transformer and DMT Modem, Wherein the Unit is Used", and which in turn is based on European Patent Application 96201060, filed Apr. 19, 1996, now EP Pat. No. 0802649, disclosing single frequency or banded noise immunity;

U.S. Provisional Application Ser. No. 60/052,122, filed Jul. 10, 1997 entitled "Transmitter with Phase Rotor, Modulator/Demodulator, Communications System and Method Performed Thereby", disclosing a rotor for DMT, now U.S. Pat. No. 6,088,386, based on U.S. patent application Ser. No. 08/892,923, and which is based on European Patent Application 96201060, filed Apr. 19, 1996, now EP Patent Publication No. 0802649;

U.S. Pat. No. 6,072,810, issued Jun. 6, 2000, based on U.S. Provisional Application Ser. No. 60/052,128, filed Jul. 10, 1997, and on regular U.S. patent application Ser. No. 08/965,141, filed Nov. 6, 1997, entitled "Method to Transparently Transport an Incoming Clock Signal over a Network Segment and Related Transmitter and Receiver Unit", disclosing an ATM time reference transport over ADSL, and which in turn is based on a European Patent Application published under Publication No. 0841767, published Jun. 13, 1998;

U.S. Provisional Application Ser. No. 60/052,126, filed Jul. 10, 1997, entitled "A Method to Synchronize Data and a Transmitter and Receiver Realizing Said Method", disclosing reversal of clocks for ATM over ADSL, now U.S. Pat. No. 5,903,612, based on U.S. patent application Ser. No. 08/965,136 filed Nov. 6, 1997 and Ser. No. 09/280,435 filed Mar. 29, 1999;

U.S. Provisional Application Ser. No. 60/052,127 filed Jul. 10, 1997, entitled "Initialization Protocol for Adaptive Data Rates and Related Transceiver", disclosing ADSL rate renegotiation, now U.S. Pat. No. 6,215,793 issued Apr. 10, 2001, based on regular U.S. patent application Ser. No. 08/967,155, filed Nov. 10, 1997, which is based on European patent application 96402413, filed Nov. 12, 1996, now EP Patent Publication No. 0841771;

U.S. Provisional Application Ser. No. 60/052,141 filed Jul. 10, 1997 entitled "Method to Allocate Data Bits, Multicarrier and Transmitter and Receiver Using the Method, and Related Allocation Message", disclosing RFI reduction in DMT systems, now U.S. patent application Ser. No. 09/007,865, filed Jan. 15, 1998, and which is based on European patent Application 97440003, filed Jan. 15, 1997, now EP Patent Publication No. 0854619;

U.S. Provisional Application Ser. No. 60/052,158 filed Jul. 10, 1997, entitled "Priority-Based Access Control Method and Arrangement", disclosing an earlier I*bus for connecting an NT to LTs, now U.S. Pat. No. 6,105,084 based on U.S. patent application Ser. No. 09/022,177, filed Feb. 11, 1998, which is based on European Patent Application 97400303, filed Feb. 11, 1997, now EP Patent Publication No. 0858035;

U.S. Provisional Application Ser. No. 60/052,111 filed Jul. 10, 1997 entitled "Current Control Interface Arrangement", disclosing a power-up circuit, now U.S. Pat. No. 5,951,660 based on regular U.S. patent application Ser. No. 08/987,949, filed Dec. 10, 1997;

U.S. Provisional Application Ser. No. 60/052,125 filed Jul. 10, 1997, now U.S. patent application Ser. No. 09/084,750, filed May 26, 1998, which is based on European Patent Application Ser. No. 97401146, filed May 26, 1997, now EP Patent Publication No. 0881853, entitled "Method for Prioritized Data Transmission and Data Transmission Arrangement", disclosing a preferred IQ bus for connecting an NT to LTs, as described in FIG. 3 above;

U.S. Provisional Application Ser. No. 60/052,133 filed Jul. 10, 1997 entitled "Multicarrier Telecom System with Power Reduction Means", based on European applicaiton AN 974011211.4, filed Jun. 2, 1997; and U.S. Pat. No. 6,246,725, issued Jun. 12, 2001 based on U.S. Provisional Application Ser. No. 60/052,140 filed Jul. 10, 1997, now U.S. patent application Ser. No. 09/087,708, filed Jun. 1, 1998, entitled "Multicarrier Telecom System with Power Adaptation Means", which is based on European Patent Application 97401210, filed Jun. 2, 1997, now EP Patent Publication No. 0883269.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Line termination equipment for use in a shelf of a telecommunications system, said line termination equipment for connection to a plurality of subscriber lines for connection to a corresponding plurality of subscriber equipment at a plurality of subscriber premises, said line termination equipment comprising:

plural subscriber channels, each comprising a hybrid circuit for connection to a corresponding twisted pair from a corresponding subscriber premises, each channel comprising:

a highpass filter for isolating a telephony signal occupying a baseband position in a frequency-division multiplexed signal (36) from a wideband signal occupying a position above baseband;

a modulator/encoder, responsive to said wideband signal for providing an encoded and modulated wideband signal to said hybrid circuit for providing said encoded and modulated wideband signal on said twisted copper pair in said position above baseband; and a demodulator/decoder, responsive to a wideband signal from said subscriber premises for providing a demodulated and decoded wideband signal to said wideband network.

2. Line termination equipment for use in a shelf of a telecommunications system, said line termination equipment for connection to a plurality of subscriber lines for connection to a corresponding plurality of subscriber equipment at a plurality of subscriber premises, said line termination equipment comprising:

plural subscriber channels, each comprising a hybrid circuit for connection to a corresponding twisted pair from a corresponding subscriber premises, each channel comprising:

a highpass filter for isolating a telephony signal occupying a baseband position in a frequency-division multiplexed signal (36) from a broadband signal occupying a position above baseband;

a modulator/encoder, responsive to said broadband signal for providing an encoded and modulated broadband signal to said hybrid circuit for providing said encoded and modulated broadband signal on said twisted copper pair in said position above baseband; and a demodulator/decoder, responsive to a broadband signal from said subscriber premises for providing a demodulated and decoded broadband signal to said broadband network.

3. The line termination equipment of claim 2, further comprising an asynchronous transfer mode (ATM) interface to a backplane bus of said shelf for processing ATM cells.

4. The line termination equipment of claim 3, wherein said modulator/encoder and demodulator/decoder comprise a distinct integrated circuit mounted on said line termination equipment and wherein said ATM interface also comprises a distinct integrated circuit mounted on said line termination equipment.

5. The line termination equipment of claim 4, further comprising a digital signal processor coupled to said hybrid for separating a received signal from a transmitted signal on said twisted pair, wherein said digital signal processor is also a distinct integrated circuit.

6. The line termination equipment of claim 2, wherein said encoded and modulated broadband signal includes information mapped onto a plurality of carrier frequencies according to a mapping table, wherein each of said frequencies carries a number of bits according to said mapping table, and wherein said demodulated and decoded broadband signal contains information demapped from a plurality of upstream carrier frequencies according to a demapping table, wherein each of said upstream frequencies carries a number of bits according to said demapping table.

7. The line termination equipment of claim 2, wherein said encoded and modulated broadband signal and said demodulated and decoded broadband signal are coded and decoded according to a forward error correction code.

8. The line termination equipment of claim 2, wherein said plural subscriber channels are separated into sub-pluralities of subscriber channels, each sub-plurality resident on a line termination card for insertion in a backplane bus of said shelf.

9. The line termination equipment of claim 8, wherein each sub-plurality of subscriber channels comprises four subscriber channels.

10. The line termination equipment of claim 6, further comprising an asynchronous transfer mode (ATM) interface for processing ATM cells.

11. The line termination equipment of claim 2, wherein said encoded and modulated signal is encoded according to a carrierless amplitude and phase modulation technique, and wherein said demodulated and decoded broadband signal is demodulated according to a carrierless amplitude and phase demodulation technique.

12. The line termination equipment of claim 11, further comprising an asynchronous transfer mode (ATM) interface to a backplane bus of said shelf for processing ATM cells.

13. A line termination card for connection to a plurality of subscriber lines, said line termination card comprising:

a plurality of line termination paths, each comprising:

a hybrid for connection to a twisted pair;

a digital signal processor (ADSLB) coupled to said hybrid for separating a received signal from a transmitted signal on said twisted pair;

a device (SACHA) for mapping/demapping information carried on a plurality of carrier frequencies on said twisted pair according to a mapping/demapping table, wherein each of said frequencies carries a number of bits according to said mapping/demapping table; and an asynchronous transfer mode (ATM) interface (RCHAP) to a shelf backplane bus into which said line termination card is insertable for processing ATM cells received and transmitted to said bus and for providing and receiving bits to and from said device (SACHA) for mapping/demapping said information.

14. The line termination card of claim 13, wherein said plurality of line termination paths is equal to four line termination paths so that said line termination card is for connection to four subscriber lines.

15. The line termination card of claim 13, wherein said digital signal processor (ADSLB), said device (SACHA) for mapping/demapping information, and said ATM interface (RCHAP) are distinct integrated circuits mounted on said line termination card.

16. The line termination card of claim 13, wherein said device (SACHA) for mapping/demapping information is also for coding/decoding said information for purposes of error correction.

17. The line termination card of claim 13, wherein access to said shelf backplane bus is granted to one or more of said plurality of line termination paths according to an access grant criterion based on quality of service associated to said at least one of said plurality of line termination paths.

18. The line termination card of claim 17, wherein said access to said shelf backplane bus is granted according to a second grant criterion, including an aging mechanism wherein when a terminal subscribing to a non-guaranteed class of service does not get access within a predetermined period, its priority is increased according to a selected algorithm to a value within a range corresponding to an access mode having a higher access probability.

19. A line termination card for use in a shelf, comprising:
   a plurality of line termination paths, each comprising:
      a high-pass filter and hybrid for connection to a twisted pair;
      a digital signal processor (ADSLB) coupled to said high-pass filter and hybrid for converting a received upstream signal from analog to digital and for converting a transmitted downstream signal from digital to analog;
      a device (SACHA) for coding/decoding and mapping/demapping information carried on a plurality of carrier frequencies according to a mapping table, wherein each of said frequencies carries a number of bits according to said mapping table; and
      an asynchronous transfer mode (ATM) interface (RCHAP) to a shelf backplane bus into which said line termination card is insertable for processing of ATM cells both upstream and downstream.

20. The line termination card of claim 19, wherein said plurality of line termination paths equals four line termination paths.

21. The line termination card of claim 19, wherein said device (SACHA) for coding/decoding and mapping/demapping information includes a fast Fourier transformer as well as an inverse fast Fourier transformer for providing and receiving a complex representation of a plurality of carrier frequencies downstream and upstream for respectively receiving and providing downstream and upstream time signals.

22. The line termination card of claim 19, wherein said digital signal processor (ADSLB), said device (SACHA) for coding/decoding and mapping/demapping information, and said ATM interface (RCHAP) comprise three distinct integrated circuits mounted on said line termination card.

23. The line termination card of claim 19, wherein access to said shelf backplane by said plurality of line termination paths is according to a weighted priority mechanism based on a quality of service guarantee.

24. The line termination card of claim 23, wherein priority is based on an aging mechanism based on time waiting for access, in addition to said weighted priority mechanism.

* * * * *